(12) United States Patent
McLaughlin

(10) Patent No.: US 8,829,441 B2
(45) Date of Patent: Sep. 9, 2014

(54) TAILGATE DETECTION USING INFRA-RED BEAMS

(76) Inventor: Brian McLaughlin, Ottawa (CA)

( * ) Notice: Subject to any disclaimer, the term of this patent is extended or adjusted under 35 U.S.C. 154(b) by 162 days.

(21) Appl. No.: 13/402,143

(22) Filed: Feb. 22, 2012

(65) Prior Publication Data

US 2012/0241624 A1    Sep. 27, 2012

Related U.S. Application Data

(60) Provisional application No. 61/454,768, filed on Mar. 21, 2011.

(51) Int. Cl.
*G08B 13/183* (2006.01)
*G01V 8/20* (2006.01)
*G07C 9/00* (2006.01)

(52) U.S. Cl.
CPC ............... *G08B 13/183* (2013.01); *G07C 9/00* (2013.01); *G01V 8/20* (2013.01)
USPC ...................................................... 250/341.1

(58) Field of Classification Search
CPC ................................................... G08B 13/183

USPC ....................................................... 250/341.1
See application file for complete search history.

(56) References Cited

U.S. PATENT DOCUMENTS

| 2003/0218122 A1* | 11/2003 | Haberer et al. ............... 250/221 |
| 2004/0093181 A1* | 5/2004 | Lee ............................... 702/150 |
| 2007/0176777 A1* | 8/2007 | Reime ........................ 340/545.3 |

* cited by examiner

*Primary Examiner* — Constantine Hannaher
(74) *Attorney, Agent, or Firm* — Nixon Peabody LLP

(57) ABSTRACT

A system, for calculating an object location within a portal, includes a portal map formed by a plurality of infra-red beams. The system further includes a broken beam detector for detecting and recording, in response to an object moving through the portal map, data indicative of one or more broken beams of the plurality of infra-red beams. The data includes first data indicative of an initial position of the object within the portal, second data indicative of a subsequent position of the object within the portal, and third data including one or more time records. The system also includes at least one broken beam analyzer for obtaining the data from the broken beam detector, the broken beam analyzer calculating the object location based on at least one of the first data, the second data, and the third data.

12 Claims, 22 Drawing Sheets

TAILGATE DETECTION USING INFRA-RED BEAMS

REFERENCE TO RELATED APPLICATIONS

This application is related to and claims priority to U.S. Provisional Patent Application Ser. No. 61/454,768, filed Mar. 21, 2011, and titled "Method For Tailgate Detection Using Infra-Red Beams," which is incorporated herein in its entirety.

BACKGROUND OF THE INVENTION

Access control systems are used extensively in security systems to ensure that only authorized people gain access to secure areas. Tailgating refers to the situation where one or more unauthorized people follow an authorized person through a secure portal such as a doorway or turnstile. Tailgate detection systems using infra-red beams have been used in optical turnstiles and in doorway tailgate detection systems for some time.

Early systems such as the prior art system of FIG. 1 use a small number of beams (sometimes only one) and are time based. Using the system of FIG. 1 as an example, the beams run perpendicular between pedestals 101 and 102. This means that when access is given, the beams are shunted or ignored for a fixed length of time to allow an authorized person 103 to pass through. If the beam(s) is broken at any other time, an alarm is generated. The shunt time has to be long enough for person 103 to pass completely through including trailing arms and legs. The problem with these systems is that two or more people, such as tailgater 104, can quickly pass through in the time allowed for the slower people to pass through. These systems also do not detect the direction of travel.

Later systems added more beams. Initially only perpendicular beams then some systems included diagonal beams. These systems now rely on patterns of beam breakages instead of time. They are able to identify direction of travel. The first systems detected tailgaters a couple of inches behind the authorized user. The current standard is now ¼".

The problem, particularly with wider passageways, is that tailgaters are not always directly behind the authorized person. They can be partially or even completely overlapped. FIG. 2 shows a situation where the authorized person 203 and tailgater 204 are partially overlapped in the passageway between pedestals 201 and 202. FIG. 3 shows the situation where the authorized person 303 and tailgater 304 are completely overlapped in the passageway between pedestals 301 and 302. The scenarios shown in FIGS. 2 and 3 are referred to as "overlap tailgating" or "overlapped passage."

Therefore, in secure portals with wider passageways, prior art tailgate detection systems fail to detect tailgaters who either partially or completely overlap with an authorized person. This could lead to serious security breaches. There exists a need for tailgate detection systems which are able to detect overlapping tailgaters in wider passageways.

SUMMARY OF THE INVENTION

In an implementation of the present invention, a system, for calculating an object location within a portal, includes a portal map formed by a plurality of infra-red beams. The system further includes a broken beam detector for detecting and recording, in response to an object moving through the portal map, data indicative of one or more broken beams of the plurality of infra-red beams. The data includes first data indicative of an initial position of the object within the portal, second data indicative of a subsequent position of the object within the portal, and third data including one or more time records. The system also includes at least one broken beam analyzer for obtaining the data from the broken beam detector, the broken beam analyzer calculating the object location based on at least one of the first data, the second data, and the third data.

In another implementation of the present invention, a system for analyzing tailgater detection within a portal includes a portal map formed by a plurality of infra-red beams. The system further includes a broken beam detector for detecting and recording, in response to an object moving through the portal map, data indicative of one or more broken beams of the plurality of infra-red beams. The system also includes a broken beam analyzer including at least one of a counter for examining the data and determining a number of objects within the portal map, and a side-by-side detector for examining the data and determining presence of side-by-side objects.

In yet another implementation of the present invention, a system for analyzing tailgater detection within a portal includes a passageway within interior of the portal, the passageway including a plurality of generally horizontal planes, each of the horizontal planes being mapped by a plurality of infra-red beams. The system further includes a broken beam detector for detecting and recording, in response to one or more objects moving through the portal, data indicative of one or more broken beams of the plurality of infra-red beams. The system also includes a broken beam analyzer for determining a plurality of patterns caused by the one or more objects within the portal, each pattern corresponding to a respective one of the horizontal planes.

In yet another implementation of the present invention, a system to analyze tailgater detection within a portal includes a portal map formed by a plurality of infra-red beams. The system further includes a broken beam detector for detecting and recording, in response to one or more objects moving through the portal, data indicative of one or more broken beams of the plurality of infra-red beams. The data includes first data indicative of an initial position of the one or more objects within the portal, second data indicative of a subsequent position of the one or more objects within the portal, and third data having one or more time records. The system also includes a broken beam analyzer having a side-by-side detector to examine the data and determine presence of side-by-side objects. The system also includes at least one of a spatial analyzer for obtaining the data from the broken beam detector and for calculating object location based on the first data and the second data, and a temporal analyzer for obtaining the data from the broken beam detector and for calculating the object location based on the third data.

In yet another implementation of the present invention, a method is directed to calculating an object location within a portal. The method includes mapping a portal with a plurality of infra-red beams to create a portal map, and detecting and recording, in response to an object moving through the portal map, data indicative of one or more broken beams of the plurality of infra-red beams. The data includes first data indicative of an initial position of the object within the portal, second data indicative of a subsequent position of the object within the portal, and third data having one or more time records. The method further includes analyzing the data from the broken beam detector to calculate the object location based on at least one of the first data, the second data, and the third data.

In yet another implementation of the present invention, a method is directed to method for analyzing tailgater detection within a portal. The method includes mapping a portal with a plurality of infra-red beams to create a portal map, and detecting and recording, in response to an object moving through the portal map, data indicative of one or more broken beams of the plurality of infra-red beam. The method further includes analyzing the data by performing at least one of (i) counting the number of objects within the portal map, and (ii) sensing presence of side-by-side objects.

In yet another implementation of the present invention, a method is directed to analyzing tailgater detection within a portal. The method includes mapping a passageway within an interior of the portal to create a portal map, the passageway including a plurality of horizontal planes, each of the plurality of horizontal planes including at least some of the plurality of infra-red beams, to create a portal map. The method further includes detecting and recording, in response to one or more objects moving through the portal map, data indicative of one or more broken beams of the plurality of infra-red beams. The method also includes analyzing the data to determine a plurality of patterns caused by the one or more objects within the portal map, each of the plurality of patterns corresponding to a horizontal plane of the plurality of horizontal planes.

In yet another implementation of the present invention, a method is directed to analyzing tailgater detection within a portal. The method includes mapping a portal with a plurality of infra-red beams to create a portal map, and detecting and recording by a broken beam detector, in response to one or more objects moving through the portal, data indicative of one or more broken beams of the plurality of infra-red beams. The data includes first data indicative of an initial position of the one or more objects within the portal, second data indicative of a later position of the one or more objects within the portal, and third data comprising one or more time records. The method further includes analyzing the data by sensing presence of side-by-side objects and by performing at least one of (i) spatially analyzing the data obtained by the broken beam detector to calculate an object location based on at least one the first and the second data, and (ii) temporally analyzing the data obtained by the broken beam detector to calculate the object location based on at least the third data.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings.

DESCRIPTION OF THE INVENTION

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
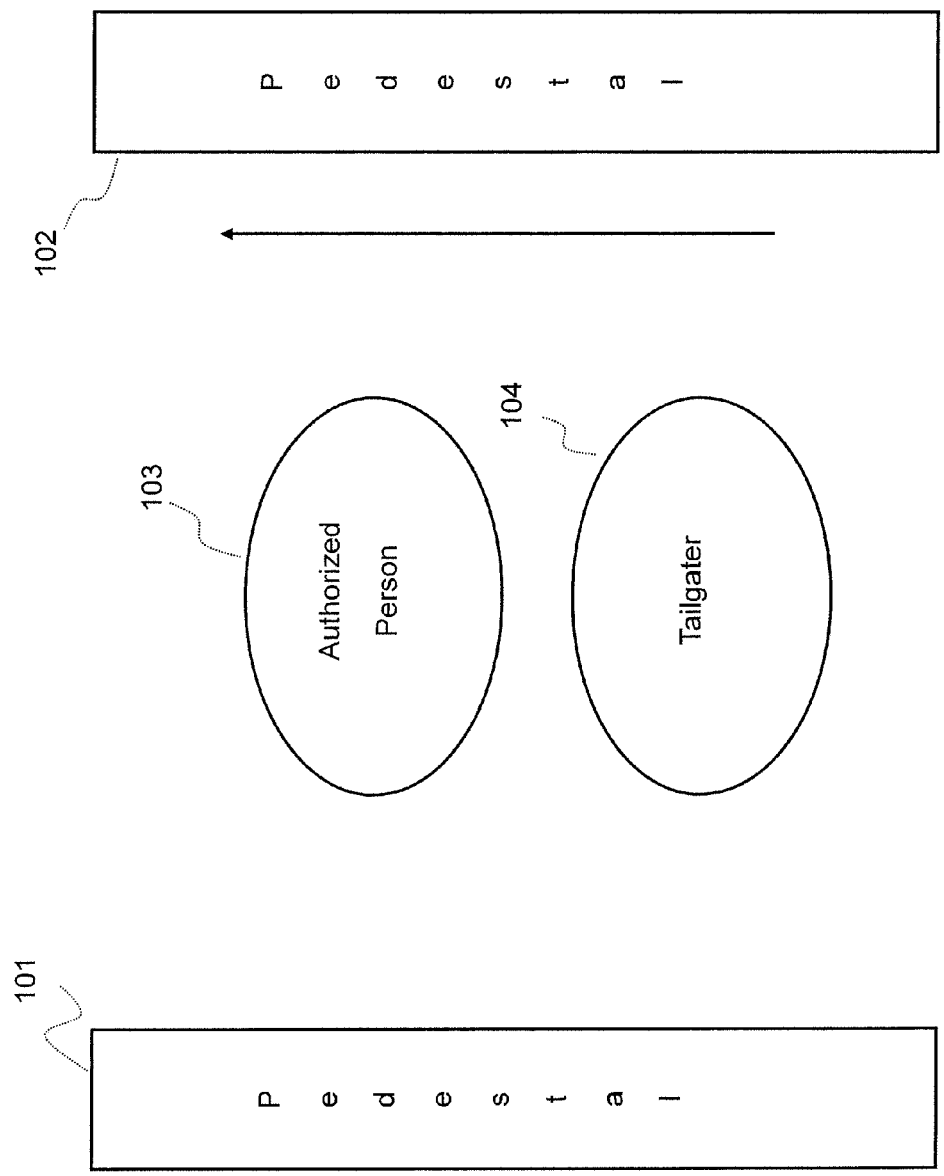
FIG. 1 shows a prior art tailgate detection system.
Figure 2:
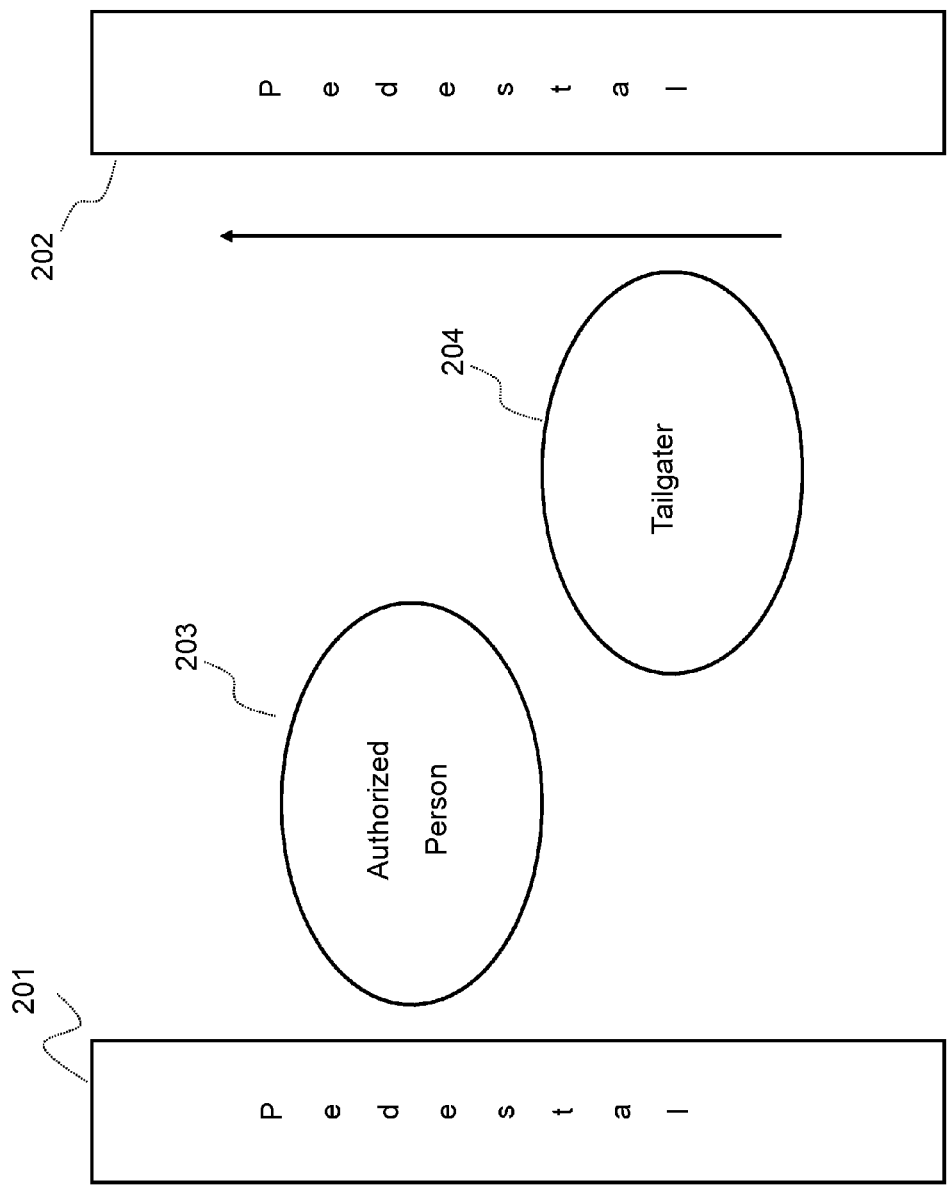
FIG. 2 shows an example of a partially overlapping tailgate.
Figure 3:
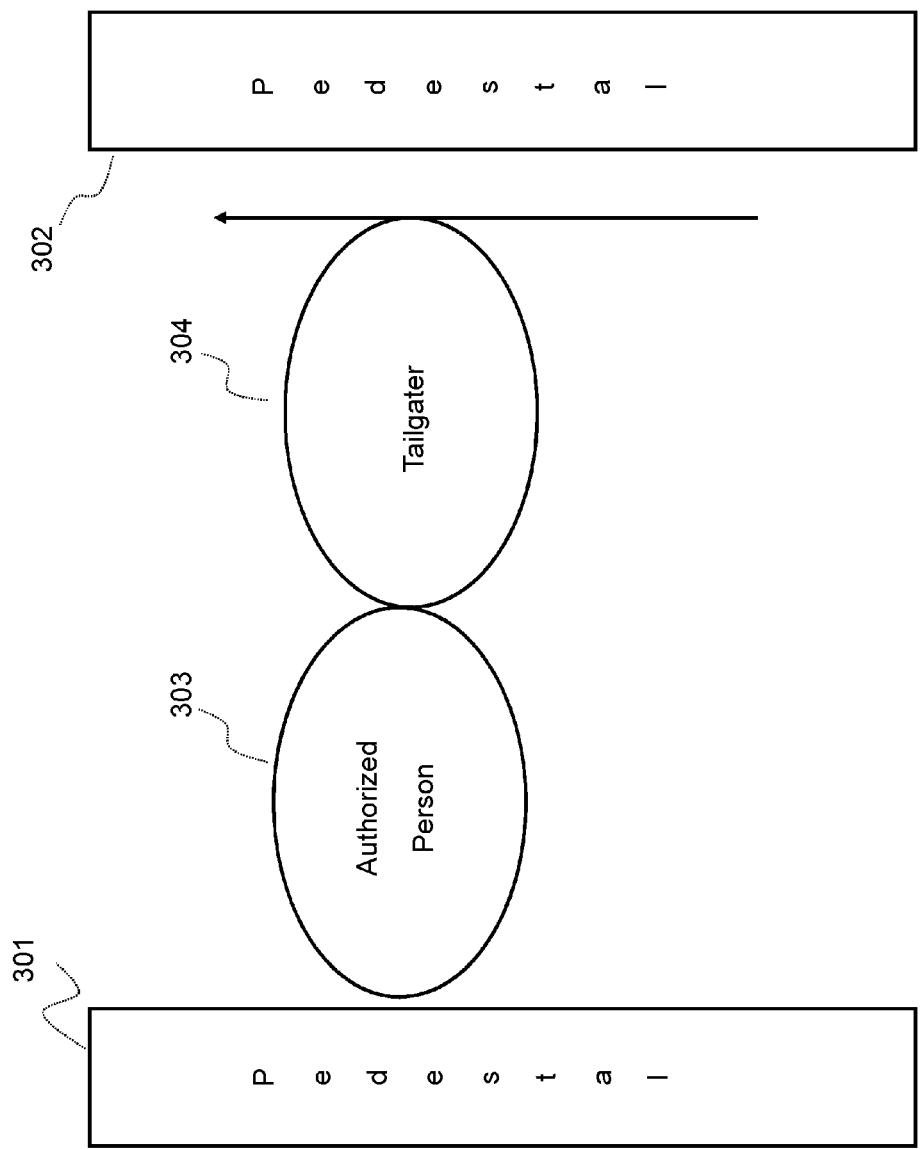
FIG. 3 shows an example of a completely overlapping tailgate.
Figure 4:
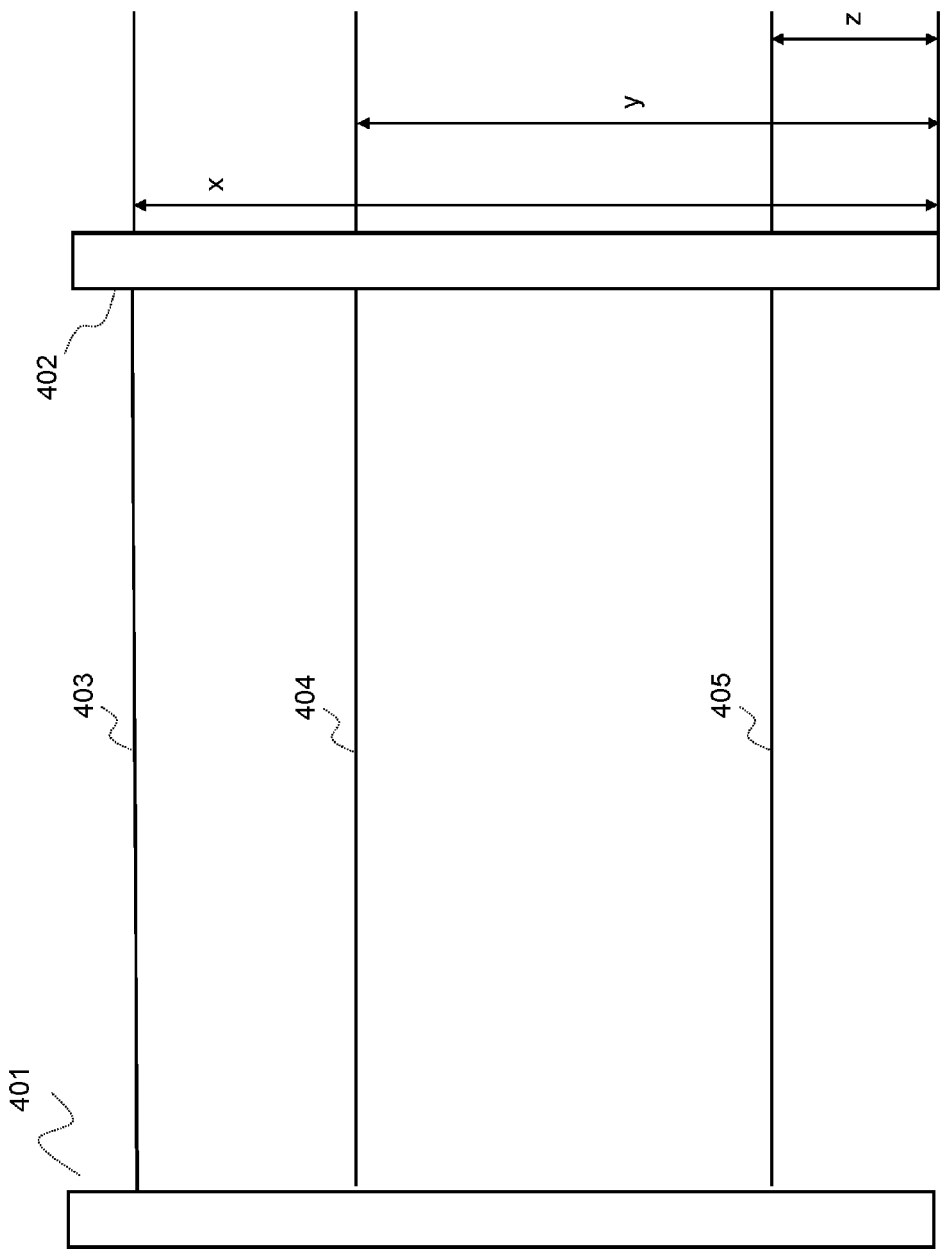
FIG. 4 shows an end view of an embodiment of the invention.
Figure 5:
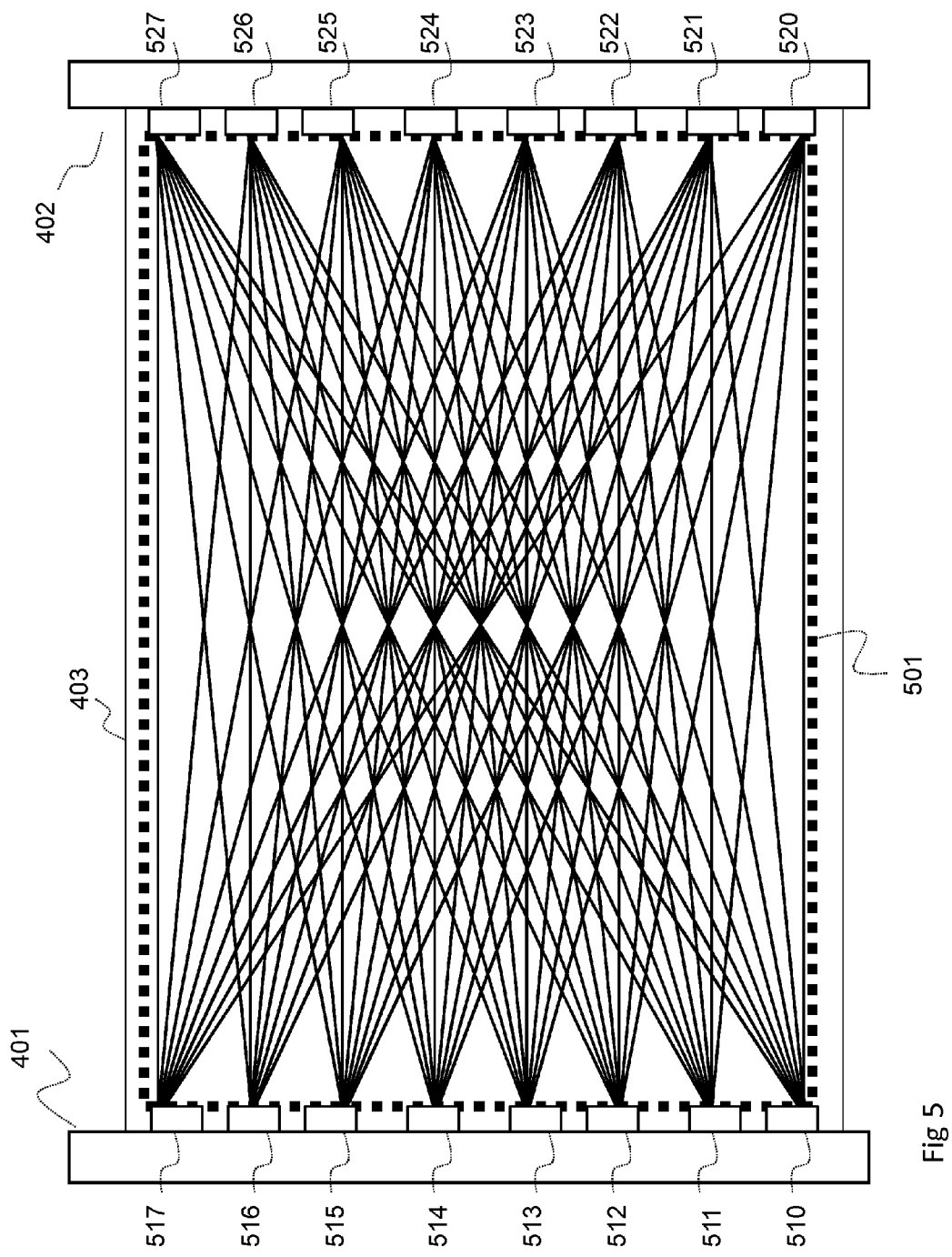
FIG. 5 shows a top view of an embodiment of the invention.

FIGS. 4 and 5 show an end view and a top view of an embodiment of the invention. There must be at least two horizontal sets of beams, with one set of beams per horizontal plane. At least one plane should be at about half the average height of a person and another in a plane close to the ground. Each set contains perpendicular and diagonal beams, and all of the perpendicular and diagonal beams between the IR transmitters and receivers are monitored. Having longer sets of beams with more extreme diagonals produces better results but there are practical limits.

FIG. 4 shows an end view of an embodiment of the invention described in this specification. There are 3 horizontal sets of beams, meaning that there are 3 planes 403, 404 and 405, at heights of x", y" and z" above the ground.

FIG. 5 shows a top view of an embodiment of the invention described in this specification, and top plane 403 is visible. FIG. 5 shows a map 501 of the portal formed by the infra-red beams transmitted by transmitters 510-517 and received by receivers 520-527 in plane 403. Similar maps could be formed by infra-red beams in other planes.

This embodiment employs improvements to a standard algorithm capable of detecting tailgaters one behind the other with minimal false alarms due to swinging arms, umbrellas, packages etc. The standard algorithm is well known in the field and will not be discussed here. The improvements to the standard algorithm lie in the use of several additional analyses, which are performed based on data obtained from the breaking or blocking of beams during a passage event through the portal map. The results of these analyses are considered together to assess the probability that an overlapped passage has occurred. These additional analyses are: distance from side, length, static object count, dynamic object count and side by side object detection and measurement. Records of which beams have been broken or are unbroken, breakage detection and corresponding data can be recorded by e.g. a broken beam detector. All, some or any of the analyses can be carried out by e.g. a broken beam analyzer, which obtains data from the broken beam detector. There may be more than one broken beam analyzers present.

Figure 6:
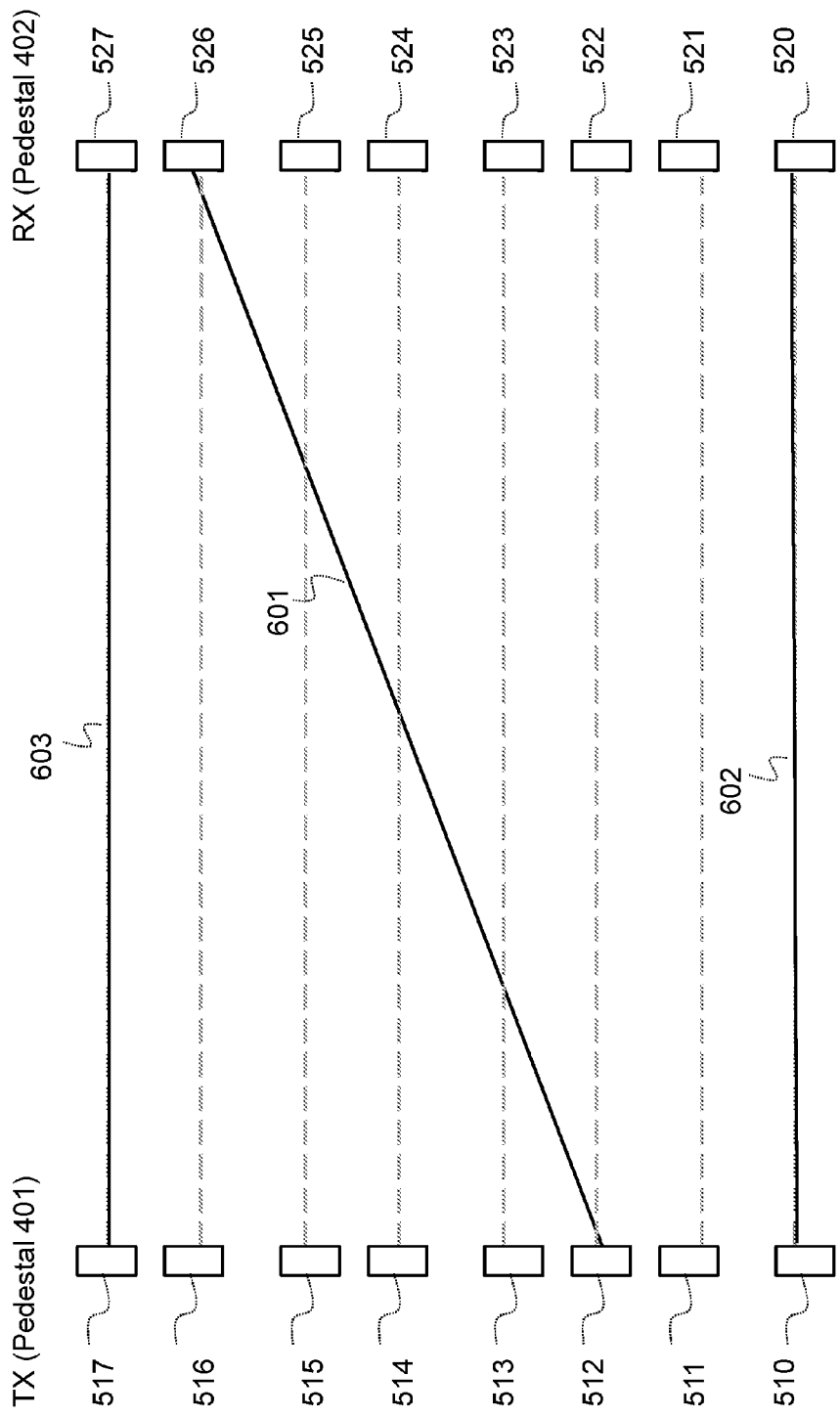
FIG. 6 shows exemplary beam [512,526].
Figure 7:
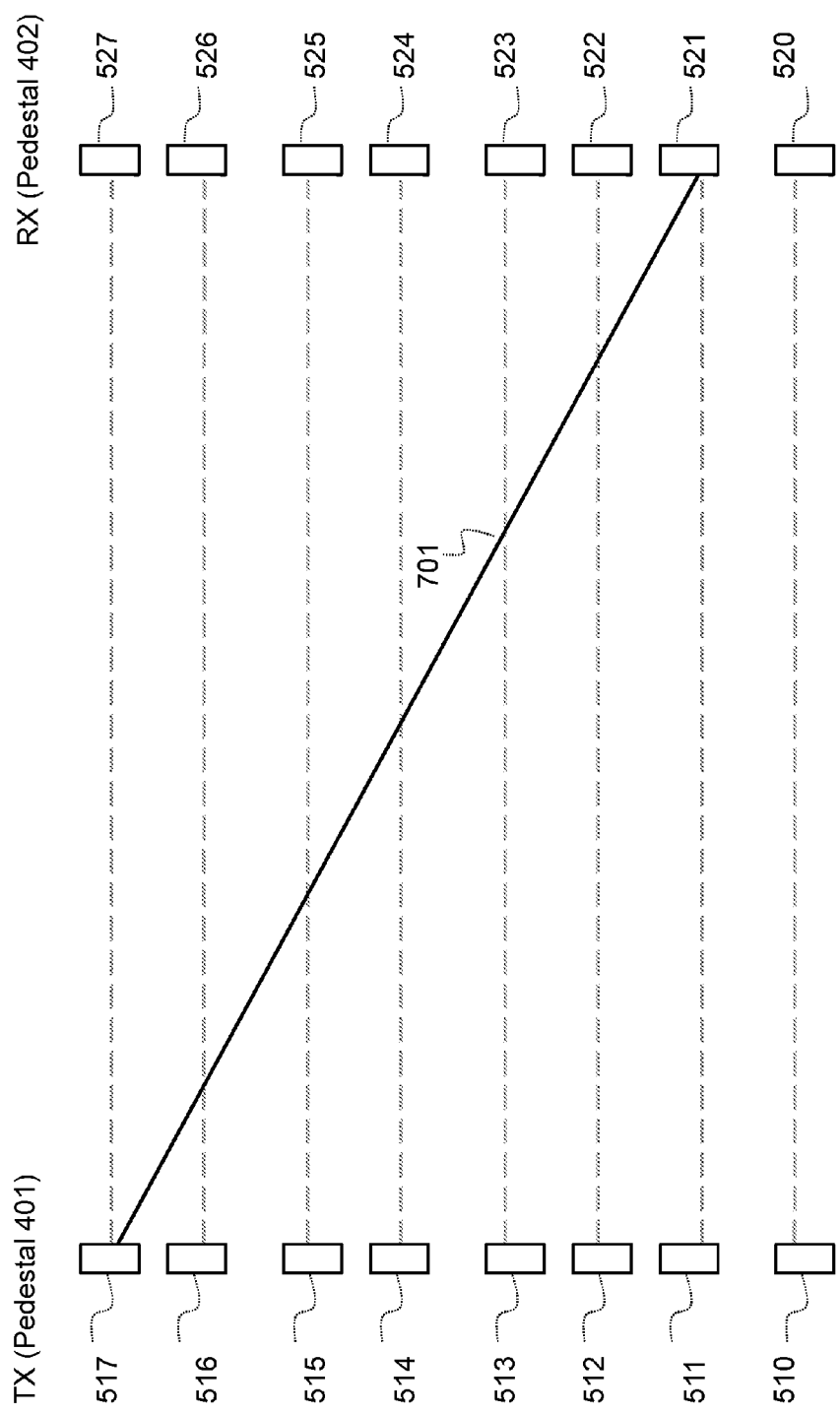
FIG. 7 shows exemplary beam [517,521].

The following convention is used to identify a beam. Referring to FIG. 6, beam[TX,RX] denotes a beam where TX refers to the IR transmitters 510-517 in pedestal 401; and RX refers to the IR receivers 520-527 in pedestal 402. Beam 601 in FIG. 6 is then denoted as beam[512,526], as it originates at transmitter 512 and terminates at receiver 526. Similarly, beam 701 in FIG. 7, is denoted as beam[517,521]. To simplify the descriptions all examples will be of objects moving from the bottom of the portal to the top of the portal. Referring to FIG. 6, this refers to the passage of objects from beam[510,520] (beam 602) to beam[517,527] (beam 603). Solid lines indicate unblocked or unbroken beams, dashed lines indicate blocked or broken beams.

There are two techniques to measure the distance between the sides of the portal and the person or object passing through. The first technique is based on the intersect points between the perpendicular beams and the diagonal beams. The second technique looks at the time between beam breaks and compares the time between perpendicular and between diagonal beam breaks. It also takes into account the times between beams being un-blocked on the trailing edge of the object.

Using the first technique, as the leading edge of the object passes through, a record is kept of diagonal beams which have already been broken This record is recalled at the moment when each perpendicular beam has just been broken, starting with the second perpendicular beam.

Figure 8:
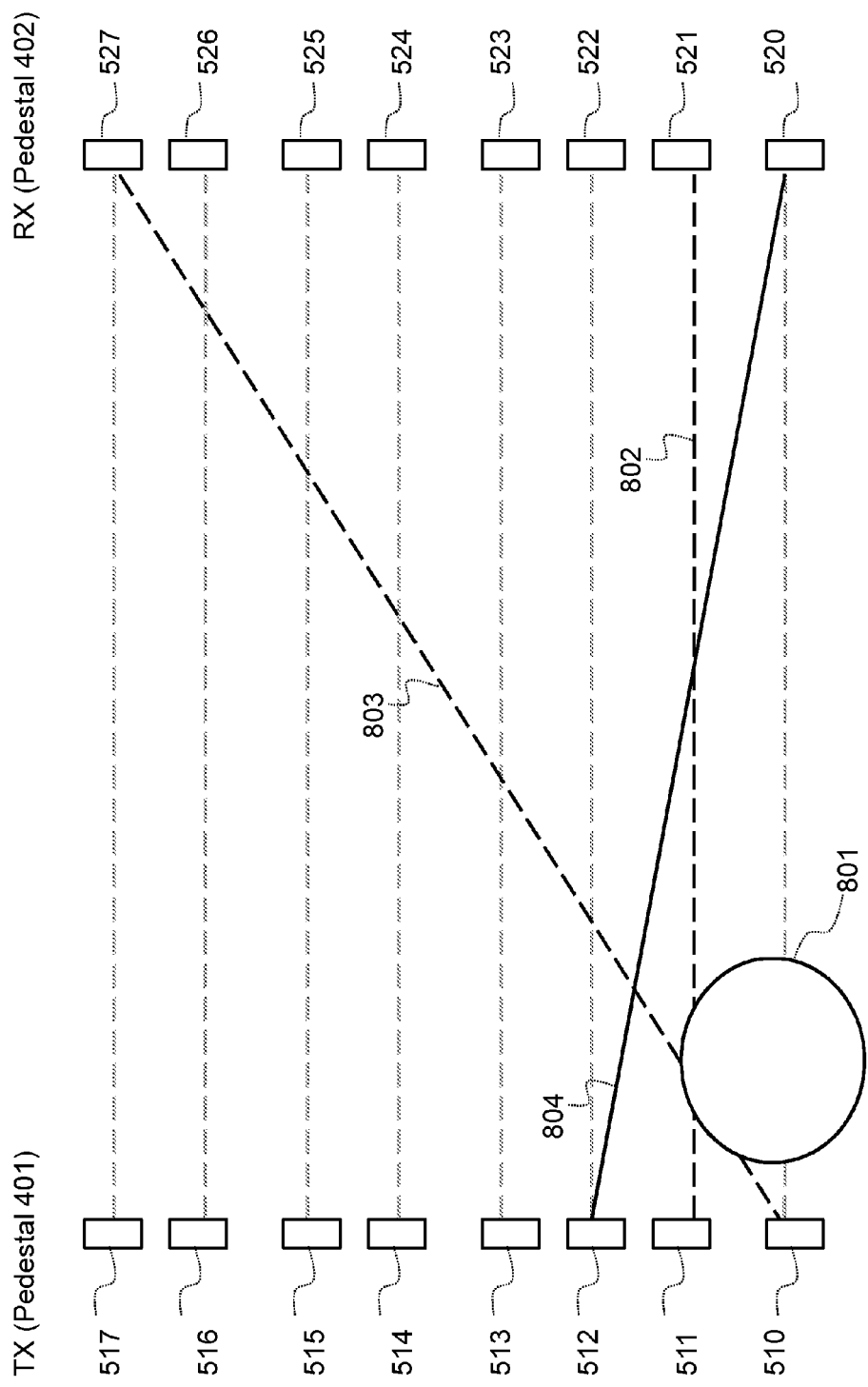
FIG. 8 shows the entrance of an object into a secure portal on the left hand side.

FIG. 8 describes the first technique. A small object 801 has just entered the portal, close to the left side and the leading edge has just broken the second perpendicular beam beam [511,521] (beam 802). Previously, beam[510,527] (beam 803) was broken, meaning that the left edge of object 801 is inside the intersection point of beam[510,527] (beam 803) and beam[511,521] (beam 802). On the other side beam[512, 520] (beam 804) has not been broken so it is known that the distance from the right hand side to object 801 is greater than the distance from the right side to the intersection of beam [512,520] (beam 804) and beam[511,521] (beam 802).

Figure 9:
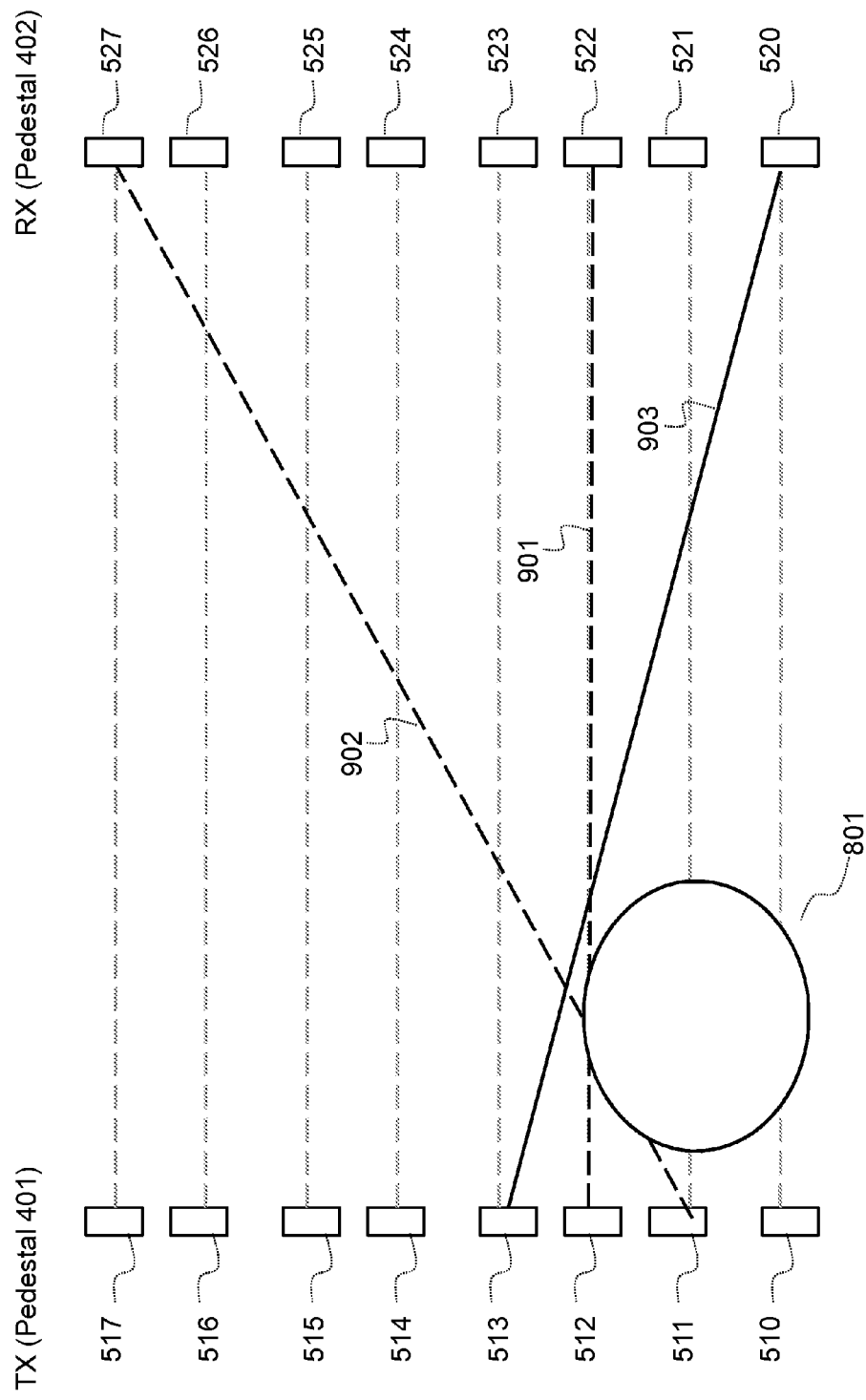
FIG. 9 shows the continued passage of an object on the left hand side of the portal.

As shown in FIG. 9, when object 801 moves forward, the leading edge breaks beam[512,522] (beam 901), after having previously broken beam[511,527] (beam 902). At this point it is known that object 801 is closer to the left than the intersection of beam[512,522] (beam 901) and beam[511,527] (beam 902). Since beam[513,520] (beam 903) is unbroken, it is known the object is farther away from the right than the intersection of beam[512,522] (beam 901) and beam[513, 520] (beam 903).

Figure 10:
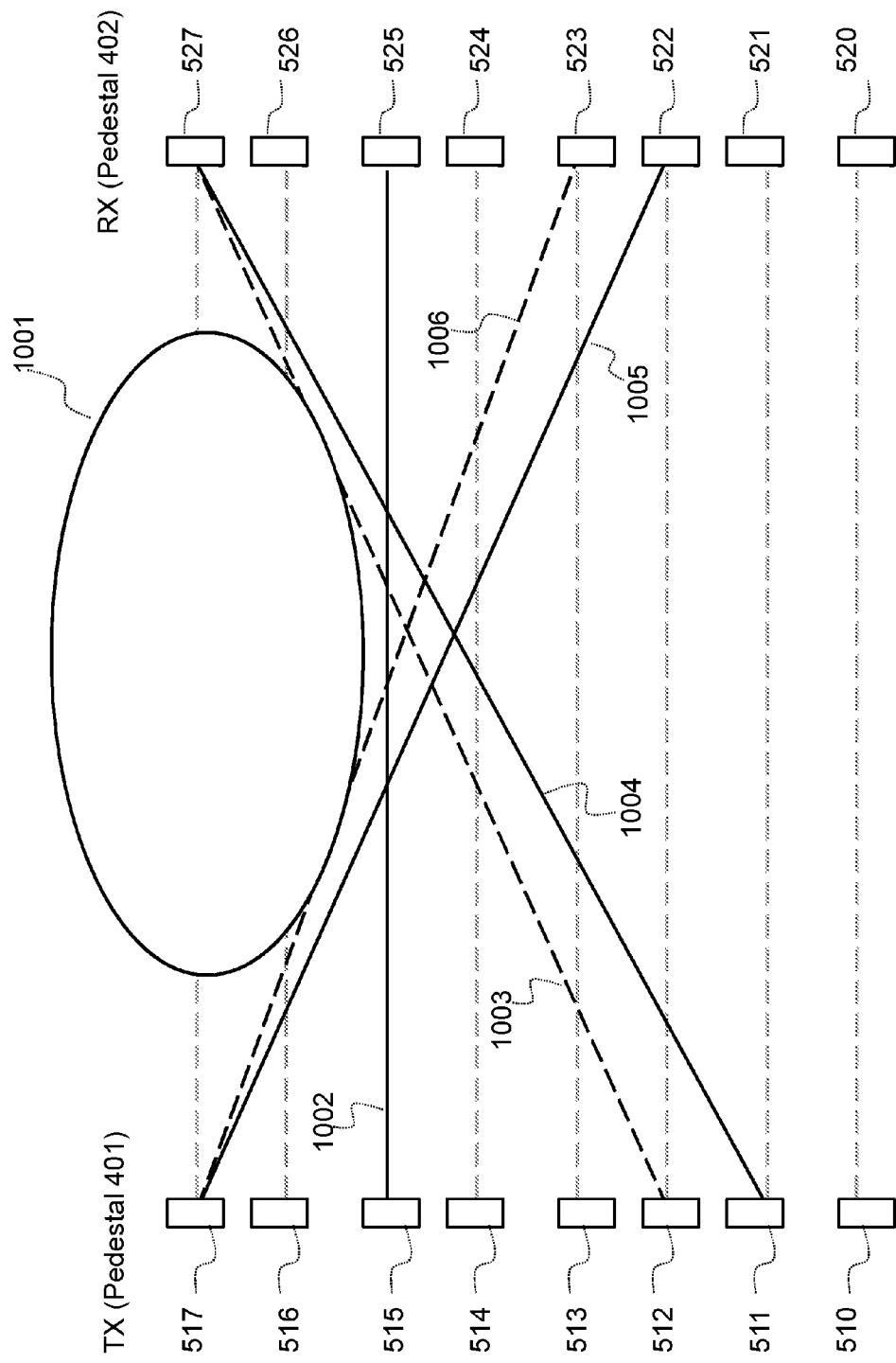
FIG. 10 shows the exit of an object from the secure portal.

In the next example shown in FIG. 10, an object 1001 is exiting the portal. Consider the trailing edge. Beam[515,525] (beam 1002) has just become unblocked. On the left side beam[517,523] (beam 1006) is blocked and beam[517,522] (beam 1005) is unblocked. On the right, beam[512,527] (beam 1003) is blocked and beam[511,527] (beam 1004) is unblocked.

Taking all of this into account, this means every part of the object is in the region to the right of beam[517,522] (beam 1005), forward of beam [515,525] (beam 1002) and to the left of beam [511,527] (beam 1004). The vertices of this region within the portal are given by the intersection of beam [517, 522] (beam 1005) with beam[515,525] (beam 1002); and the intersection of beam [511,527] (beam 1004) with beam [515, 525] (beam 1002).

However, some part of the object is still not within the region to the right of beam[517,523] (beam 1006), forward of beam [515,525] (beam 1002) and to the left of beam [512, 527] (beam 1003). The vertices of this region within the portal are given by the intersection of beam [517,523] (beam 1006) with beam[515,525] (beam 1002); and the intersection of beam [512,527] (beam 1003) with beam [515,525] (beam 1002).

Figure 11:
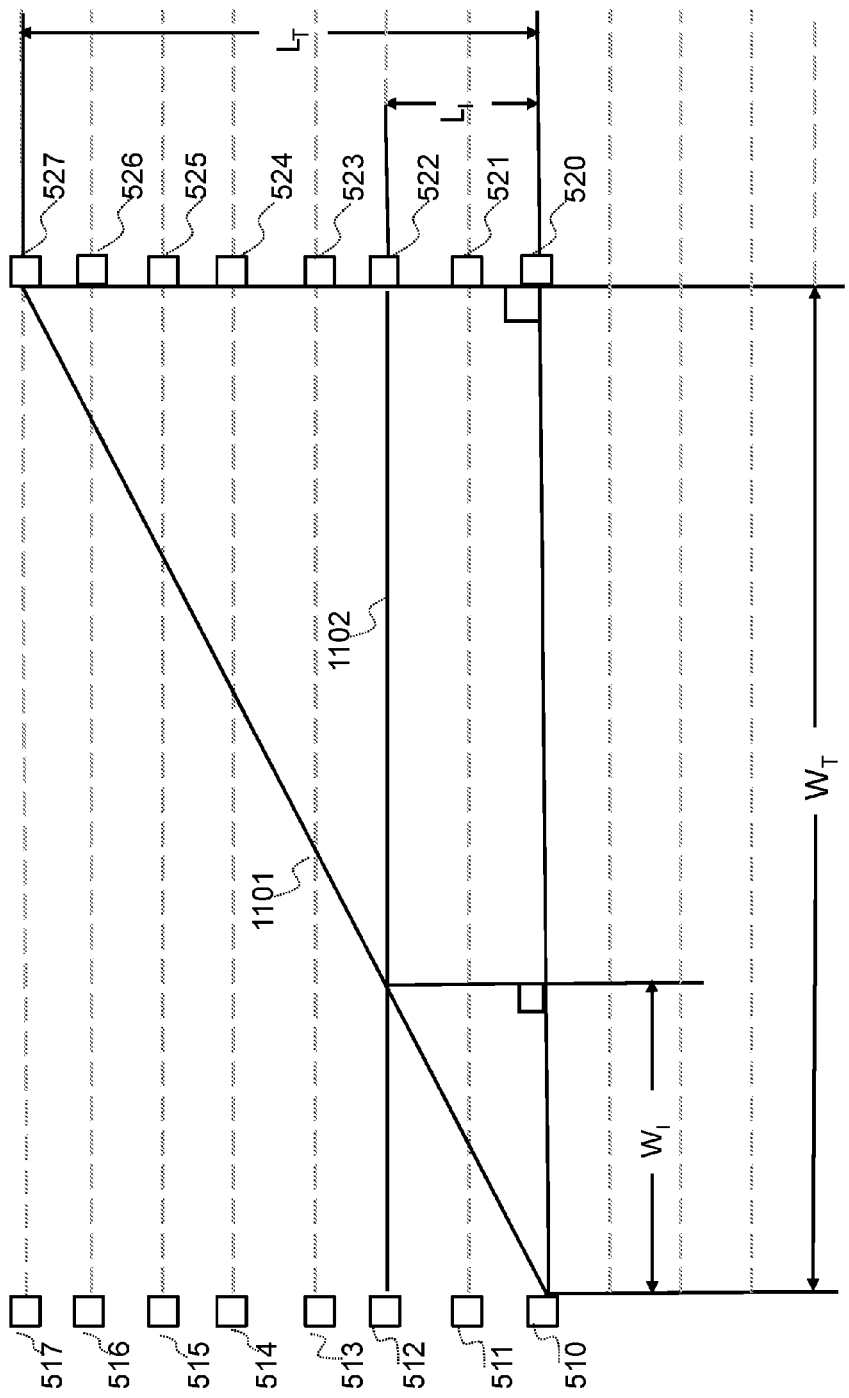
FIG. 11 shows the calculation of an intersection point.

The calculation of distance from side to the intersection points is shown in the following examples. FIG. 11 shows the calculation of the distance from the side to the intersection point of beam[510,527] (beam 1101) and beam[512,522] (beam 1102). As can be seen from FIG. 11, the ratio between $W_I$ and $W_T$ is the same as the ratio between $L_I$ and $L_T$.

$$W_I/W_T = L_I/L_T \qquad 1)$$

$$L_I = 2 \text{ and } L_T = 7 \qquad 2)$$

$$W_I = W_T * 2/7 \qquad 3)$$

So the distance from the left hand side to the intersection point of beam[510,527] (beam 1101) and beam[512,522] (beam 1102) is $2/7^{th}$ of the total width ($W_T$).

Figure 12:
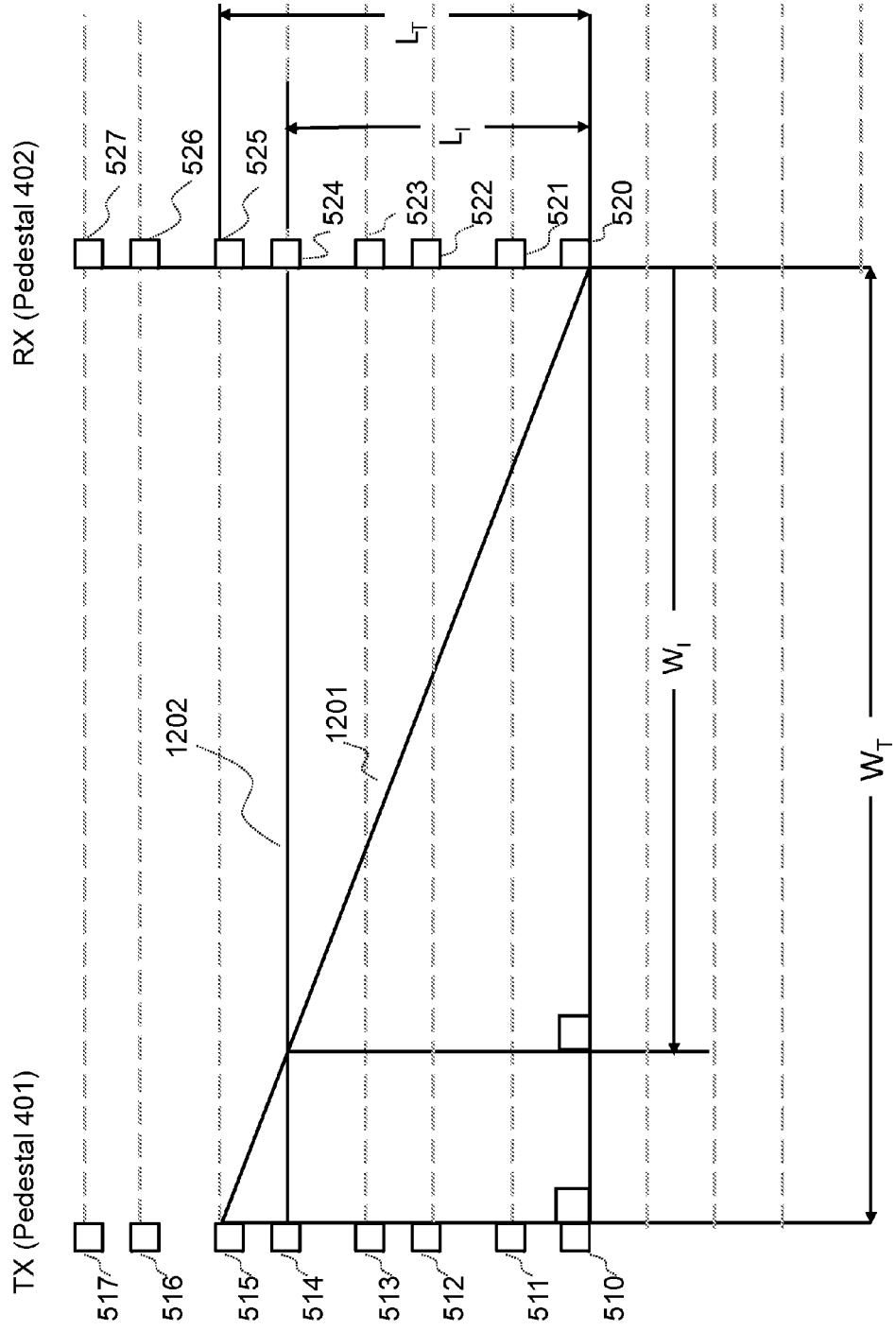
FIG. 12 shows a further example of a calculation of an intersection point.

FIG. 12 shows the calculation of the distance from the right side to the intersection point of beam[515,520] (beam 1201) and beam[514,524] (beam 1202). The principle is the same:

$$W_I/W_T = L_I/L_T \qquad 1)$$

$$L_I = 4 \text{ and } L_T = 5 \qquad 2)$$

$$W_I = W_T * 4/5 \qquad 3)$$

Figure 13:
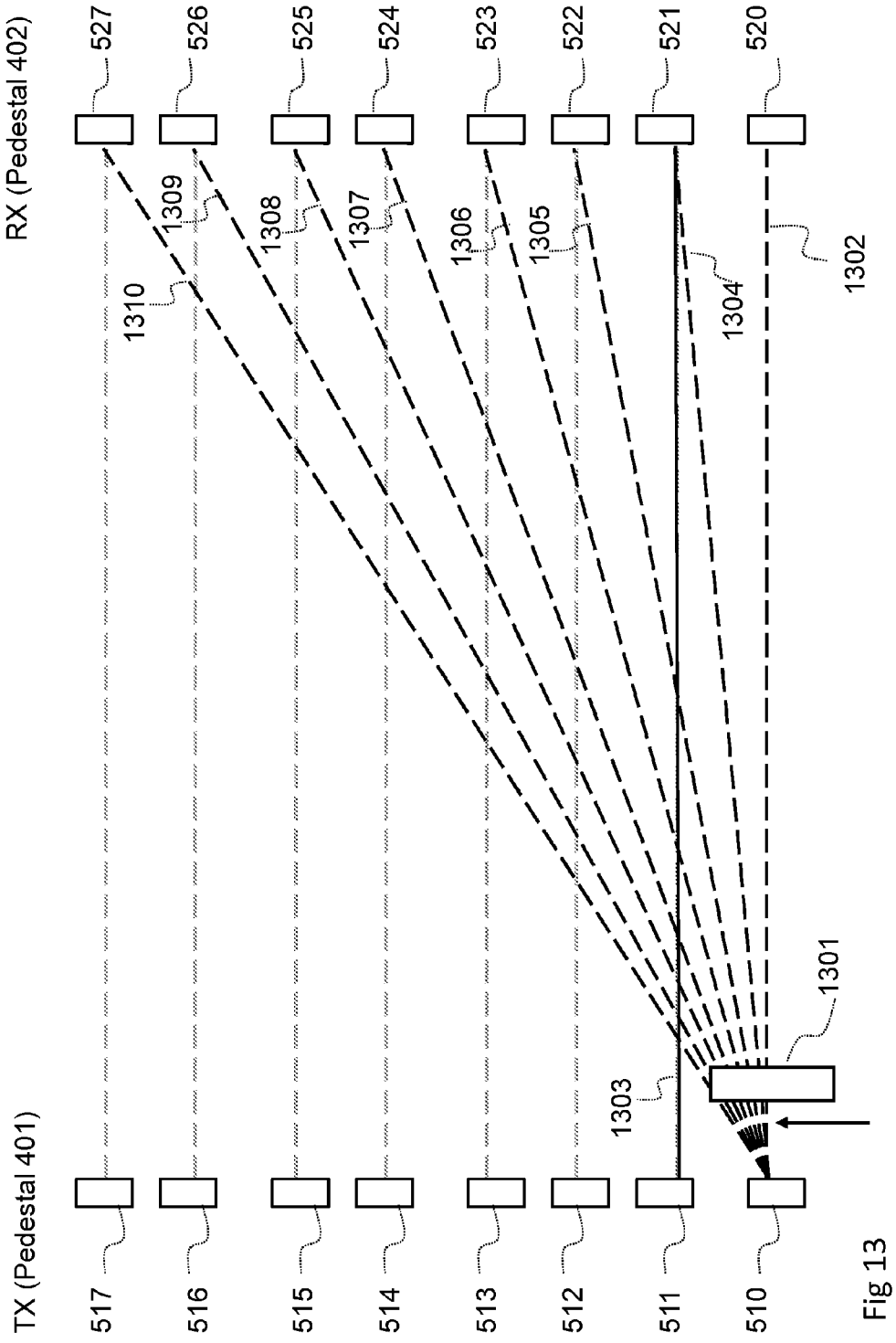
FIG. 13 shows the calculation of the position of an object on the left hand side of the portal by comparing the time between perpendicular beam blocks (or un-blocks) and diagonal ones.

So the distance from the right hand side to the intersection point of beam[515,520] (beam 1201) and beam[514,524] (beam 1202) is $4/5^{th}$ of the total width ($W_T$). All of these analyses can be carried out by e.g. the broken beam analyzer as stated earlier, or by a specialized "spatial analyzer" which forms part of the broken beam analyzer The second technique of measuring distance from the side compares the time between perpendicular beam blocks (or un-blocks) and diagonal ones. Consider what happens when object 1301 passes from beam[510,520] (beam 1302) to beam [511,521] (beam 1303) as shown in FIG. 13. If object 1301 is close to the left hand side, the time between beam[510,520] (beam 1302) being broken and the diagonal beam[510,521] (beam 1304) is very short, compared to the time between beam[510,520] (beam 1302) and beam[511,521] (beam 1303). In fact, if object 1301 is close enough to the left, all the diagonals from the set of beams originating at transmitter 510 (beam[510,521], beam[510,522] . . . beam[510,527] corresponding to beams 1304-1310 respectively) will be blocked before beam[511,521] (beam 1303). Distance from the right hand side can be measured in the same manner, except the diagonal beams now terminate at receiver 520.

Figure 14:
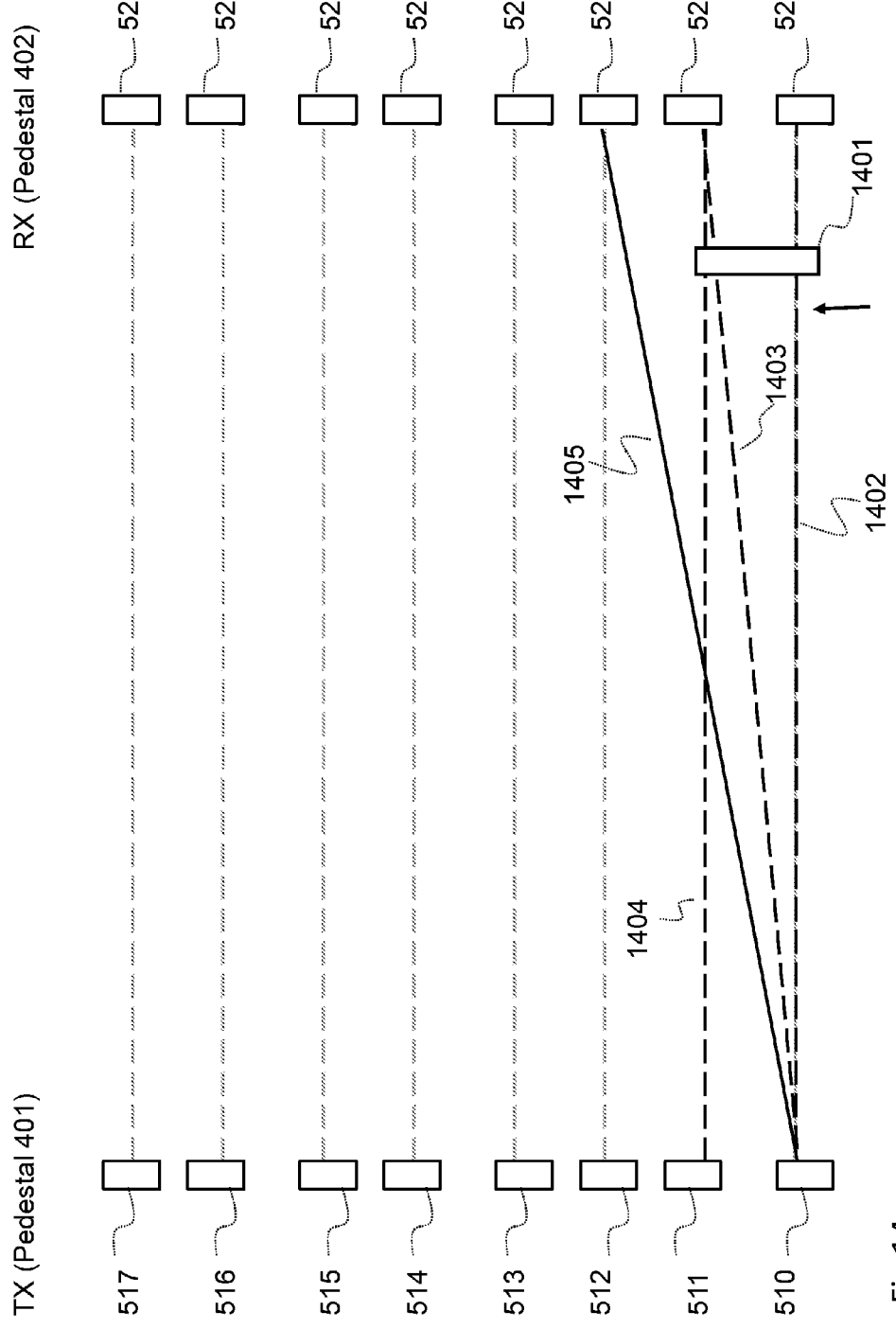
FIG. 14 shows the calculation of the position of an object on the right hand side of the portal by comparing the time between perpendicular beam blocks (or un-blocks) and diagonal ones.

In the case of an object being quite far from the left, such as object 1401 in FIG. 14, the ratio of the time between perpendicular beam[510,520] (beam 1402) being broken and diagonal beam[510,521] (beam 1403); to the time between beam [510,520] (beam 1402) and beam[511,521] (beam 1404); is larger than when the object was close to the left. As distance from the left increases, this ratio approaches one. If the object is far enough, the more extreme diagonals (beam[510,522] etc.) will be broken after beam[511,521] (beam 1404).

In general, as an object passes through, the ratio between:

the time between the breaking of a perpendicular beam and a particular diagonal beam which starts at the left hand side at the same point as the perpendicular beam and the time between the perpendicular beam from "a" and the next perpendicular beam, is proportional to the distance from the left hand side. Examples of diagonals of the same angle are the set containing beam[510,521], beam[511,522], beam[512,523] etc. or the set containing beam[510,522], beam[511,523], beam[512,524] etc.

The set of diagonals with the smallest angle is the set containing beam[510,521], beam[511,522], beam[512,523] etc. The set of diagonals with the next smallest angle is the set containing beam[510,522], beam[511,523], beam[512,524].

Starting with the set of diagonals with the smallest angle, as the object passes through, the distance from the left can be measured up to 7 times using the following:

(time from beam[510,520] to beam[510,521])/(time from beam[510,520] to beam[511,521]),
(time from beam[511,521] to beam[511,522])/(time from beam[511,521] to beam[512,522]),
(time from beam[512,522] to beam[512,523])/(time from beam[512,522] to beam[513,523]),
(time from beam[513,523] to beam[513,524])/(time from beam[513,523] to beam[514,524]),
(time from beam[514,524] to beam[514,525])/(time from beam[514,524] to beam[515,525]),
(time from beam[515,525] to beam[515,526])/(time from beam[515,525] to beam[516,526]) and
(time from beam[516,526] to beam[516,527])/(time from beam[516,526] to beam[517,527])

Using the next smallest angle (beam[510,522], beam[511,523], beam[512,524] etc.), 6 measurements can be made. As the angle increases, the number of measurements possible per passage diminishes.

The same calculations are done on the right side. Both right and left side calculations are also made on the trailing edge of the object by looking at the delays as beams become unbroken. All of these analyses can be carried out by e.g. the broken beam analyzer as stated earlier, or by a specialized "temporal analyzer" which forms part of the broken beam analyzer.

Figure 15:
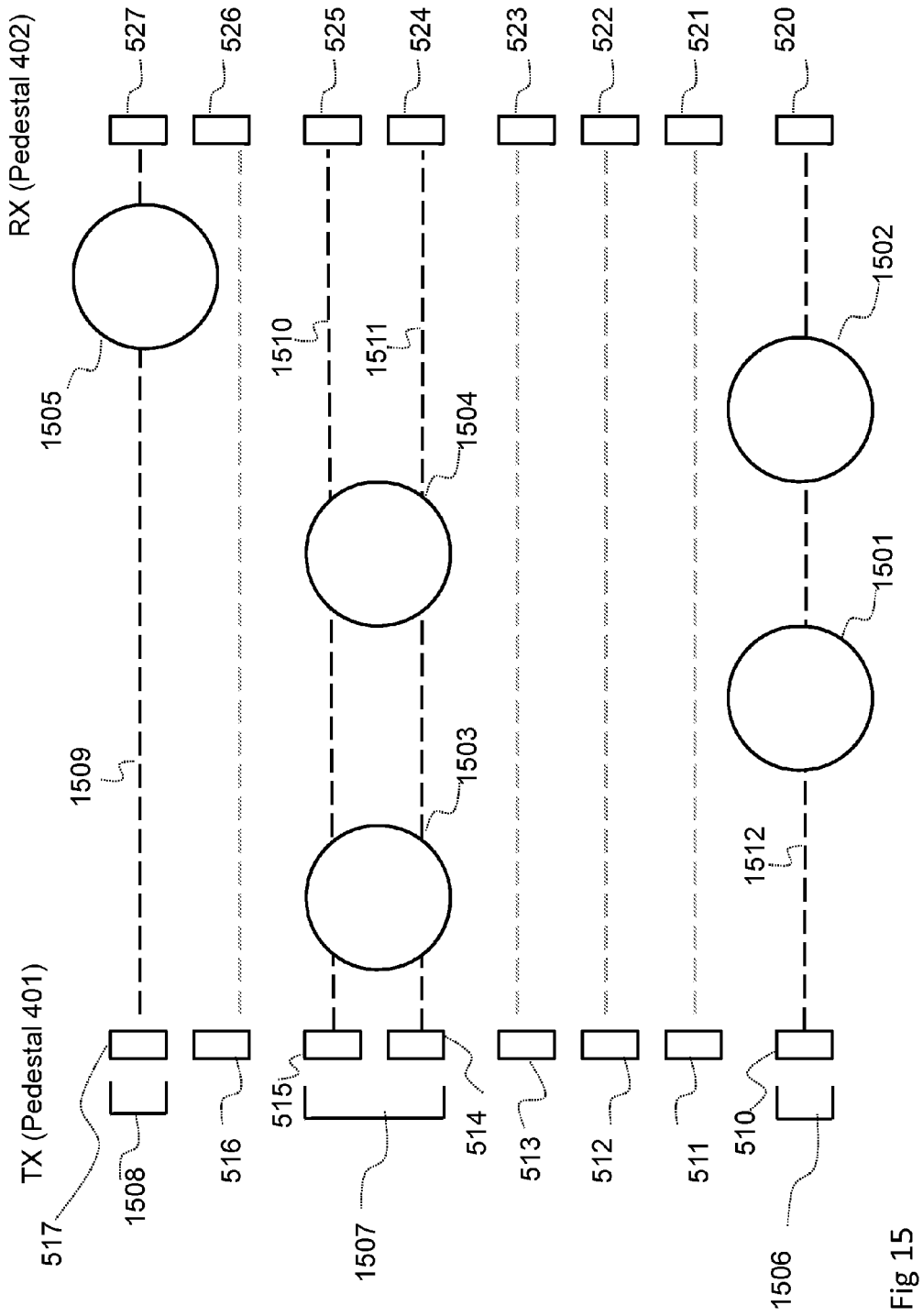
FIG. 15 shows a static object count.

A static object count can also be carried out. The static object count is particularly useful on lower planes to count the number of legs currently in the portal. The count begins with a scan of the perpendicular beams to find groups of blocked beams. In the example shown in FIG. 15, there are 5 objects 1501, 1502, 1503, 1504 and 1505. 3 groups are found:

1) Group 1506 consisting of objects 1501 and 1502,
2) Group 1507 consisting of objects 1503 and 1504, and
3) Group 1508 consisting of object 1505 implying that there are at least three objects.

Figure 16:
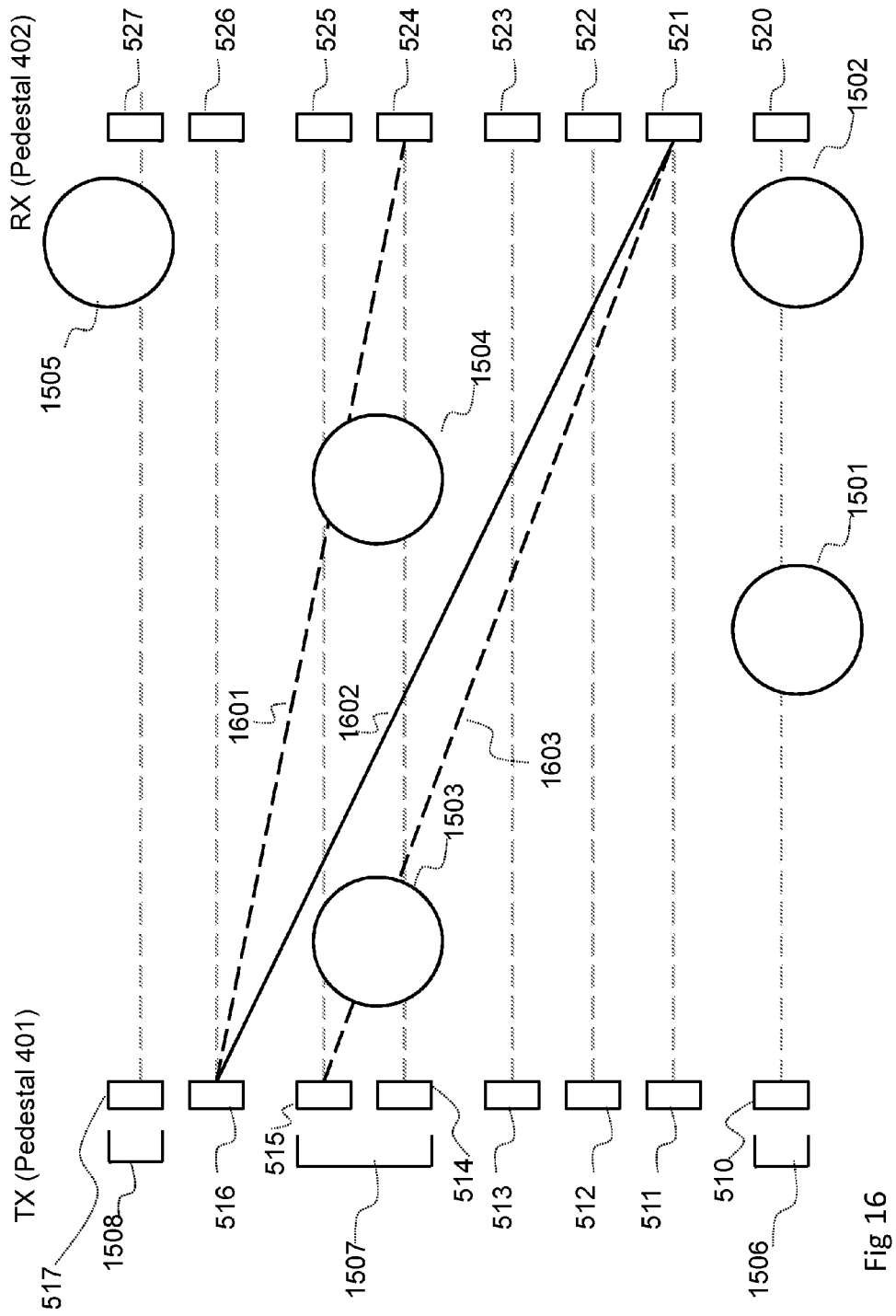
FIG. 16 shows analysis of a group of objects to determine whether there are objects side by side.

Next, groups 1506, 1507 and 1508 are analyzed to see if side by side objects can be found, as shown in FIG. 16. For groups 1506 and 1508, because they are blocking only one perpendicular beam at either the start or end, there are no diagonal beams that can be used to detect side by side objects. For group 1507, diagonal beams between transmitters 511 to 516 and receivers 521 to 526 will be examined. The unblocked beam[516,521] (beam 1602) indicates the possibility of multiple objects in group 1507. The fact that beam [516,524] (beam 1601) and beam[515,521] (beam 1603) are blocked indicates that there is an object on either side of beam[516,521] corresponding to beam 1602 (not just objects 1503 or 1504). Now, a total of four objects have been detected. It is possible in some cases to detect more than two side by side objects. The counting operations can be carried out by e.g. the broken beam analyzer as stated earlier, or by a specialized counter which forms part of the broken beam analyzer. Alternatively, the static object count can be carried out by a specialized "static object counter" which forms part of the broken beam analyzer.

Figure 17:
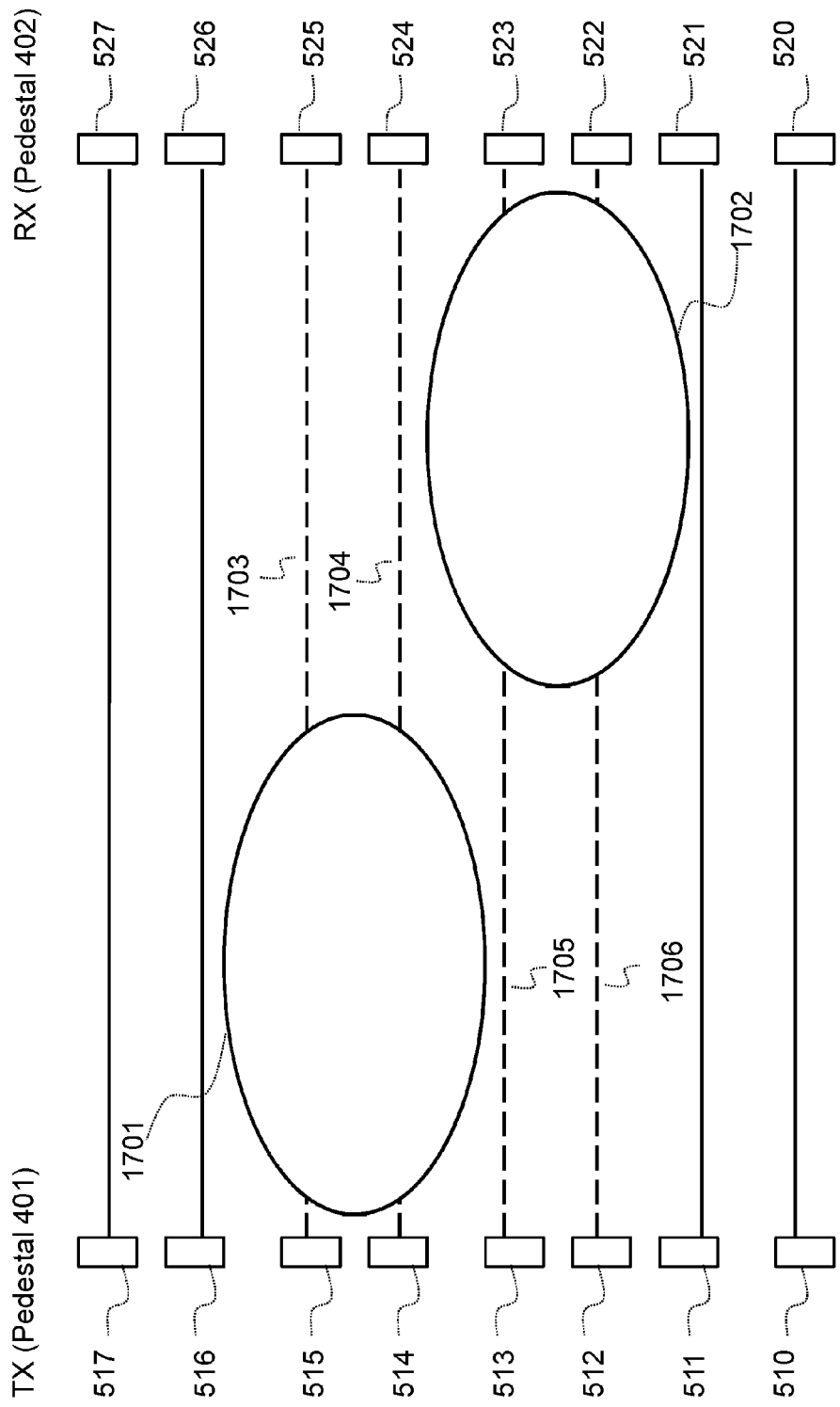
FIG. 17 shows analysis of a group of objects to detect and measure side by side objects.

Side by side object detection and measurement can also be carried out. This is similar to the static object count except that it is concerned only with side by side objects that have a minimum size. The first step is to scan the perpendicular beams to find groups of blocked beams. In this analysis, only groups greater than or equal to a minimum size are considered. For the sake of this example the minimum size is 4 blocked perpendicular beams in a row. In FIG. 17 there are 4 blocked perpendicular beams in a row (beams 1703-1706).

Figure 18:
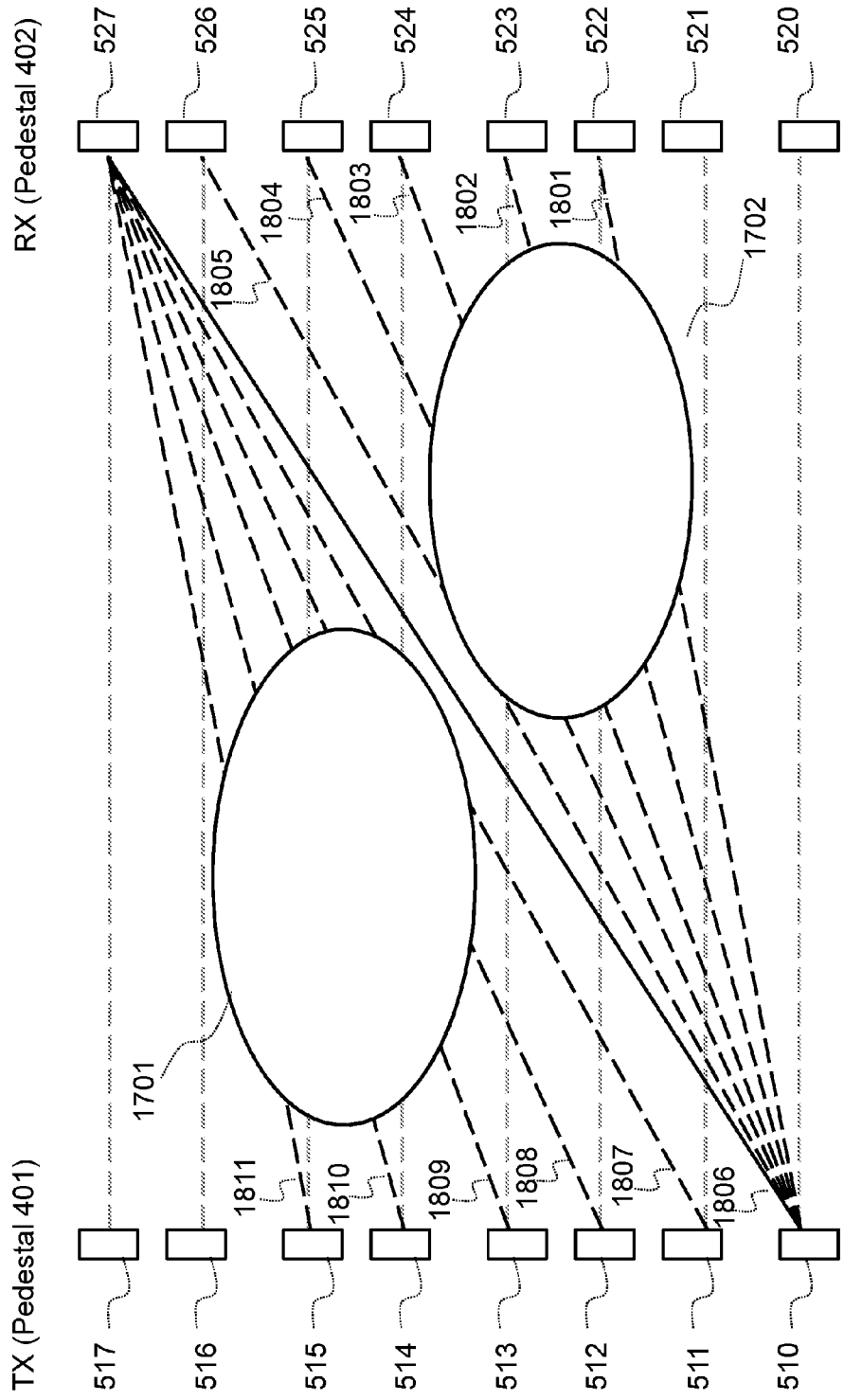
FIG. 18 shows further analysis of a group of objects to detect and measure side by side objects.

Examining the diagonals in FIG. 18, it is seen that beam [510,527] (beam 1806) is unblocked and is passing through the group of perpendicularly blocked beams. Fanning out from transmitter 510, 5 consecutive blocked diagonals are found (beams 1801-1805). Fanning out from receiver 527, 5 consecutive blocked diagonals are found. (beams 1807-1811) Now it is clear that there are objects on either side of beam [510,527] (beam 1806). Also, since there are more than 4 blocked beams in each fan they are likely large objects. The side-by-side detection can be carried out by e.g. the broken beam analyzer as stated earlier, or by a specialized side-by-side detector which forms part of the broken beam analyzer.

Determining the length of an object is one of the basic techniques used in optical turnstiles for distinguishing between bodies and smaller objects such as swinging arms. The analysis is well known but as shown in paragraphs [00031]-[00034], this information can be used in other ways. The length detection can be carried out by e.g. the broken beam analyzer as stated earlier, or by a specialized length detector which forms part of the broken beam analyzer.

Dynamic object count refers to the task of counting the number of objects that pass through the turnstile/portal in a given time period. It is a commonly performed task in optical turnstiles. It is particularly useful for counting how many legs have passed through the lower beams. Dynamic object count can be carried out by the broken beam analyzer as stated earlier, or by the specialized counter which forms part of the broken beam analyzer. Alternatively, dynamic object count can be carried out by a specialized "dynamic object counter" which forms part of the broken beam analyzer, and which interacts with the static object counter described previously.

None of these determinations alone is able to reliably detect overlapped passage with low false alarm rates but when used together, the detection rate goes up considerably while the false alarm rate goes down.

Figure 19:
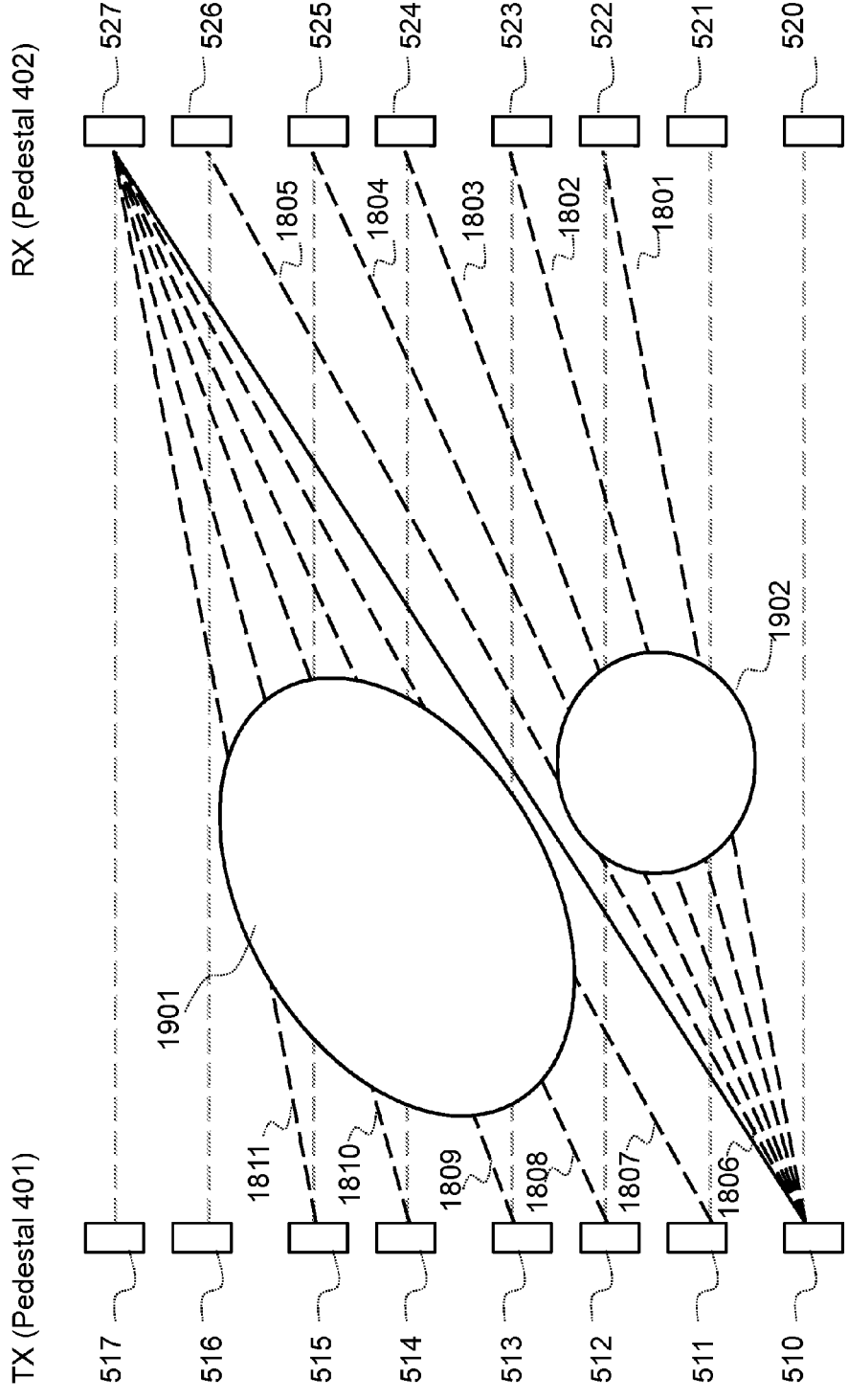
FIG. 19 shows another possible scenario, which could cause the pattern seen in FIG. 18.

For example, the beam pattern of FIG. 18 could also be caused by the scenario in FIG. 19 i.e. where there is a large object 1901 such as a body and a smaller second object 1902 which could be an arm trailing behind the body.

Figure 20:
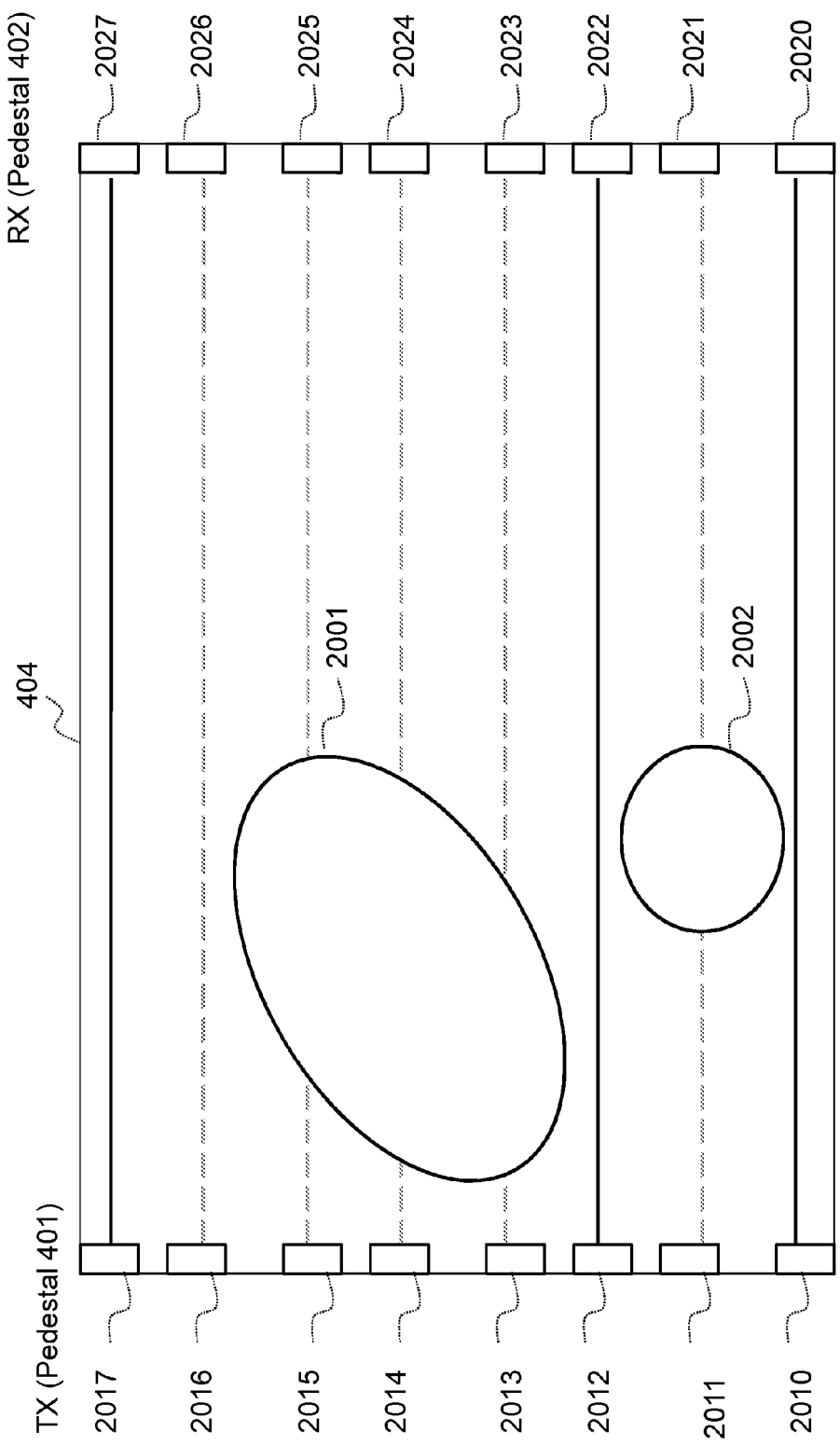
FIG. 20 shows the pattern depicted on a lower plane.

However, consider the beam pattern created in the set of beams in a lower plane. Recall from FIG. 4, that plane 404 is below plane 403 currently being considered. As shown in FIG. 20, plane 404 contains beams transmitted by 8 IR transmitters 2010-2017 and received by 8 IR receivers 2020-2027. By looking at the set of beams in plane 404 it is expected that a large object 2001 would be seen in about the same position. The lower part of the trailing arm 2002, however, is likely to be further back in the beam field as shown in FIG. 20. So the information from plane 404 does not show two overlapping bodies in the portal.

Figure 21:
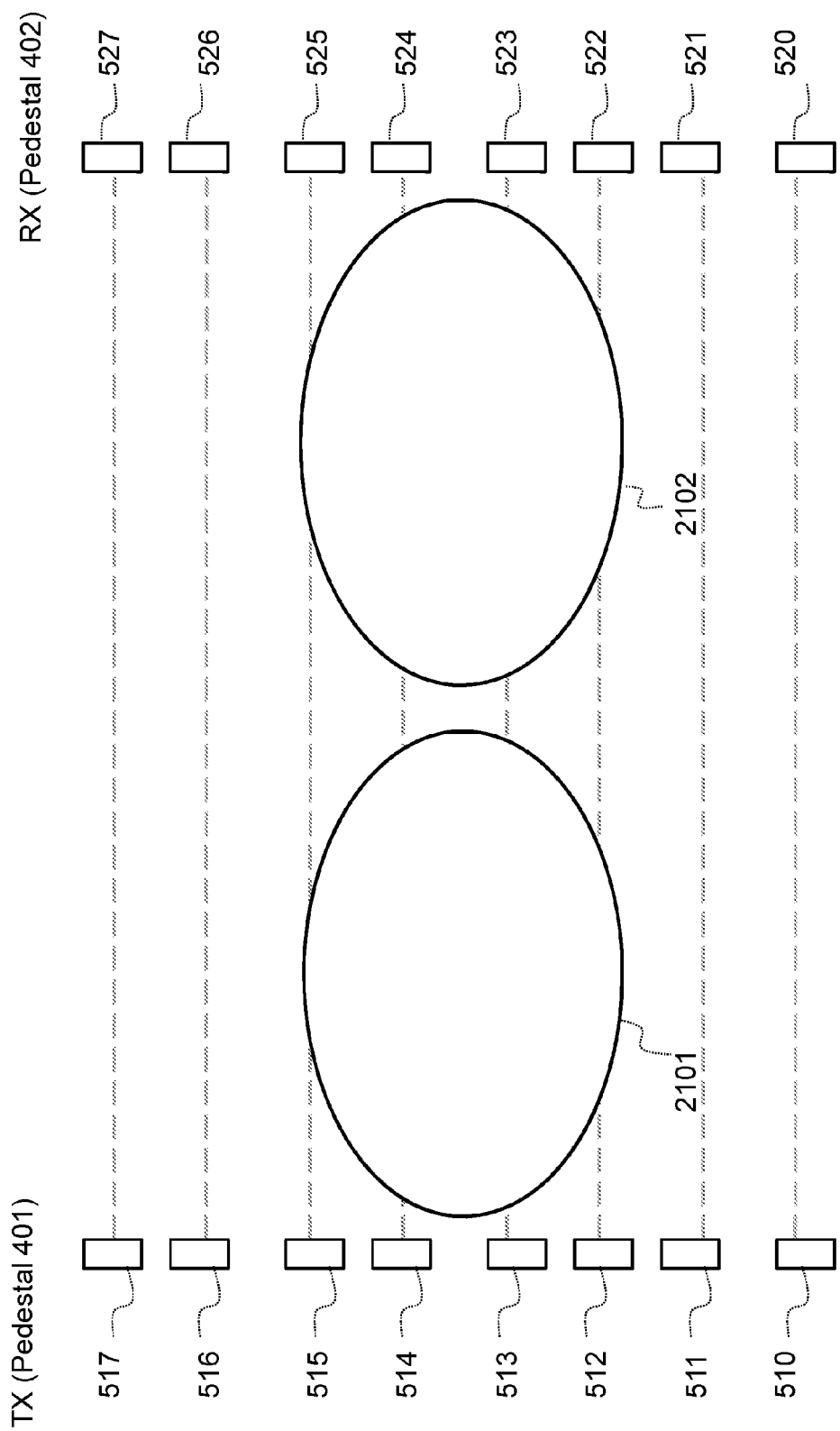
FIG. 21 shows another scenario of detection and measurement of side by side objects.

FIG. 21 shows objects 2101 and 2102 in plane 403. Assuming that it was a single object, then the short distances from each side to the object show that it is a wide object. The length measurement shows that the length of the object is much less than the width. This makes it more likely that objects 2101 and 2102 are two smaller people side by side rather than one large object/person. If four objects (legs) are detected at a lower plane e.g. plane 404 or 405 in FIG. 4, then the probability becomes much higher.

Figure 22:
FIG. 22 shows a basic flow chart showing how the improved tailgate detection is incorporated into the optical turnstile algorithm.

FIG. 22 shows a basic flow chart showing how the improved tailgate detection is incorporated into the optical turnstile algorithm. This analysis can be carried out e.g. by the broken beam analyzer, or by a specialized "master analyzer" within the broken beam analyzer.

Step 2201: Wait for change in beam states.

Step 2202: Standard beam analysis step for normal tailgate detection. Strategies for this already exist so they are not discussed here.

Step 2203: Distance from the sides and therefore width of object is calculated using one of the two ways previously described.

Step 2204: The static object count using the previously described way is performed on the bottom row of beams. The current and maximum counts are stored.

Step 2205: The number of objects that have passed through the bottom beams is recorded here. Strategies for this already exist so they are not discussed here.

Step 2206: The side by side object detection and measurement, as previously described is applied. Each time side by side objects are detected, the smaller fan size is recorded. During the passage, the maximum value of this smaller fan size is stored.

Step 2207: The length of the objects in the turnstile are calculated and the maximum lengths during the passage are stored.

Step 2208: Is a passage detected using standard algorithms?

Step 2209: Passage is reported.

Step 2210: Has a signature for an overlapped passage been detected? An example signature is side by side fan size greater than a given threshold, a width greater than a given threshold and a lower object count greater than 2. For a given configuration of beams, statistical analysis of the results obtained for a large series of single and double, overlapped passages will identify the unique characteristics of each type of passage.

Step 2211: Passage is reported

Step 2212: Is the lane empty—no beams blocked?

Step 2213: Clear accumulated passage data.

These analyses are not unique to a particular configuration of beams. They can be applied with beams at more or fewer heights, with more or fewer beams at a given level. The effectiveness increases as more beams are added. In particular, increasing the number and span of beams at a particular level increases the effectiveness of the static count and side by side object detection and measurement. In addition, the detection, recording and analysis of data by e.g. the broken beam detector and broken beam analyzer, and any components which form part of both units as described previously can be implemented in hardware using dedicated circuitry, or as part of a larger system such as a processor, computer, server or in a distributed/networked fashion; or in software using dedicated applications, or as part of a larger program, or in a distributed/networked fashion; or some combination of both hardware and software.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A system for calculating an object location within a portal, the system comprising:
   at least one portal map formed by a plurality of infra-red beams, wherein the plurality of infra-red beams includes one or more perpendicular infra-red beams and one or more diagonal infra-red beams;
   said at least one portal map created using one or more transmitters and one or more receivers, further wherein each transmitter transmits at least one perpendicular beam and at least one diagonal beam, and wherein each receiver receives at least one perpendicular beam and at least one diagonal beam;
   a broken beam detector for detecting and recording, in response to an object moving through the at least one portal map, data indicative of one or more broken beams of the plurality of infra-red beams, the data including first data, second data, and third data, the first data being indicative of an initial position of the object within the portal, the second data being indicative of a subsequent position of the object within the portal, and the third data including one or more time records; and
   at least one broken beam analyzer for obtaining the data from the broken beam detector, the broken beam analyzer calculating the object location based on at least one of the first data, the second data, and the third data.

2. The system of claim 1,
   wherein the first data includes data associated with at least one diagonal infra-red beam of the one or more diagonal infra-red beams, the at least one diagonal infra-red beam being a beam broken by the object in the initial position;
   wherein the second data including data associated with at least one perpendicular infra-red beam of the one or more perpendicular infra-red beams, the at least one perpendicular infra-red beam being a beam broken by the object in the subsequent position; and
   wherein the at least one broken beam analyzer is a spatial analyzer, the spatial analyzer calculating object location by comparing the first data and the second data.

3. The system of claim 2, wherein the comparing of the first data and the second data includes determining an intersection between the at least one diagonal infra-red beam and the at least one perpendicular infra-red beam.

4. The system of claim 1,
   wherein the first data includes data associated with at least one perpendicular infra-red beam of the one or more perpendicular infra-red beams, the at least one perpendicular infra-red beam being a beam broken by the object in the initial position;
   wherein the second data includes data associated with at least two infra-red beams of the plurality of infra-red beams, the at least two infra-red beams being beams broken by the object in at least two subsequent positions;
   wherein the third data includes an initial time record, the initial time record corresponding to the at least one perpendicular infra-red beam being broken by the object in the initial position;
   wherein the third data includes one or more final time records, each final time record corresponding to a respective one of the at least two subsequent positions; and
   wherein the at least one broken beam analyzer is a temporal analyzer, the temporal analyzer calculating object location by comparing the initial time record and the one or more final time records.

5. The system of claim 4, wherein the temporal analyzer further compares (a) a first time difference between a first one of the final time records and the initial time record and (b) a second time difference between a second one of the final time records and the initial time record.

6. A method for calculating an object location within a portal, the method comprising:
- mapping a portal with a plurality of infra-red beams to create a at least one portal map, wherein the at least one plurality of infra-red beams includes at least one or more perpendicular infra-red beams and at least one or more diagonal infra-red beams;
- wherein said mapping is performed using one or more transmitters and one or more receivers, further wherein each transmitter transmits at least one perpendicular beam and at least one diagonal beam, and wherein each receiver receives at least one perpendicular beam and at least one diagonal beam;
- detecting and recording, in response to an object moving through the at least one portal map, data indicative of one or more broken beams of the plurality of infra-red beams, the data including a first data indicative of an initial position of the object within the portal, the data including a second data indicative of a subsequent position of the object within the portal, the data including a third data having one or more time records; and
- analyzing the data from the broken beam detector to calculate the object location based on at least one of the first data, the second data, and the third data.

7. The method of claim 6,
- wherein the first data includes data associated with at least one diagonal infra-red beam of the one or more diagonal infra-red beams, the at least one diagonal infra-red beam being a beam broken by the object in the initial position;
- the second data includes data associated with at least one perpendicular infra-red beam of the one or more perpendicular infra-red beams, the at least one perpendicular infra-red beam being a beam broken by the object in of the subsequent position; and
- wherein the analyzing includes comparing the first data and the second data.

8. The method of claim 7, wherein the comparing includes determining an intersection between the at least one perpendicular infra-red beam and the at least one diagonal infra-red beam.

9. The method of claim 6,
- wherein the first data includes data associated with at least one perpendicular infra-red beam of the one or more perpendicular infra-red beams, the at least one perpendicular infra-red beam being a beam broken by the object in the initial position;
- wherein the second data comprises data associated with at least two infra-red beams of the plurality of infra-red beams, the at least two infra-red beams being beams broken by the object in at least two subsequent positions, and wherein at least one of the at least two infra-red beams is a diagonal infra-red beam;
- wherein the third data includes an initial time record, the initial time record corresponding to the at least one beam being broken by the object in the initial position, the third data including at least two final time records, each of the at least two final time records corresponding to a respective one of the at least two subsequent positions; and
- wherein the analyzing includes comparing the initial time record to the at least two final time records.

10. The method of claim 9, wherein the comparing comprises comparing (a) a first time difference between a first one of the at least two final time records and the initial time record with (b) a second time difference between a second one of the at least two final time records and the initial time record.

11. The method of claim 6, further comprising at least a first portal map and a second portal map;
- the first portal map formed by some of the plurality of infra-red beams within a first horizontal plane; and
- the second portal map formed by some of the plurality of infra-red beams within a second horizontal plane.

12. The method of claim 11, further comprising
- determining a first intersection between a first perpendicular beam and a first diagonal beam within the first horizontal plane; and
- determining a second intersection between a second perpendicular beam and the second diagonal beam within the second horizontal plane.

* * * * *